US006564831B1

(12) United States Patent
Sanoner et al.

(10) Patent No.: US 6,564,831 B1
(45) Date of Patent: May 20, 2003

(54) ENTRUDED MULTITUBULAR DEVICE

(75) Inventors: Sergio Oscar Sanoner, Buenos Aires (AR); Rafael Ricardo Levy Fresco, Buenos Aires (AR); Jorge Marciano, Buenos Aires (AR)

(73) Assignees: Gaimont Universal Ltd. B.V.I., Road Town Tortola (GB); Jorge Hector Marciano, Buenos Aires (AR); Alfredo Rojas, Buenos Aires (AR); Horacio Di Nezio, Buenos Aires (AR); Pablo Demare, Buenos Aires (AR)

( * ) Notice: Subject to any disclaimer, the term of this patent is extended or adjusted under 35 U.S.C. 154(b) by 0 days.

(21) Appl. No.: 09/500,642

(22) Filed: Feb. 9, 2000

(30) Foreign Application Priority Data

Mar. 23, 1999 (AR) .......................... 990101256
Oct. 26, 1999 (AR) .......................... 990105387

(51) Int. Cl.[7] ................................ F16L 11/00
(52) U.S. Cl. ................ 138/115; 138/118; 138/DIG. 11
(58) Field of Search ................ 138/115, 116, 138/117, 118, DIG. 11

(56) References Cited

U.S. PATENT DOCUMENTS

| 417,992 | A | * | 12/1889 | Dell ........................... 138/114 |
| 2,161,666 | A | * | 6/1939 | Cowen ........................ 138/115 |
| 3,110,754 | A | * | 11/1963 | Witort et al. ................ 138/115 |
| 3,889,715 | A | * | 6/1975 | Lilja et al. ................... 138/117 |
| 3,941,157 | A | * | 3/1976 | Barnett ........................ 138/115 |
| 4,273,065 | A | * | 6/1981 | Lindsay et al. ............. 138/115 |
| 4,343,844 | A | * | 8/1982 | Thayer et al. ............... 138/115 |
| 4,474,426 | A | * | 10/1984 | Yataki ......................... 138/115 |
| 4,496,823 | A | * | 1/1985 | Mann ........................... 138/115 |
| 4,729,409 | A | * | 3/1988 | Paul ............................. 138/115 |
| 5,765,598 | A | * | 6/1998 | Goddard et al. ............. 138/115 |
| 5,924,456 | A | * | 7/1999 | Simon .......................... 138/115 |
| 6,032,699 | A | * | 3/2000 | Cochran et al. ............. 138/104 |
| 6,102,077 | A | * | 8/2000 | Legallais et al. ........... 138/115 |

* cited by examiner

*Primary Examiner*—James Hook
(74) *Attorney, Agent, or Firm*—Finnegan, Henderson, Farabow, Garrett & Dunner, L.L.P.

(57) ABSTRACT

A multitubular device having an external cylindrical or regular polygonal tubing with a profile of longitudinally constant or invariable section and internal cavities defined by separating membranes, the external cylindrical or regular polygonal tubing and the separating membranes being made of high density polyethylene (HDPE) or equivalents thereof. Preferably, the multitubular device is a heptatube, a dodecatube or a tridecatube. The heptatube version has an external cylindrical tubing (1) of longitudinally constant section profile to provide seven cavities (2) defined by separating membranes (3), six of the cavities being of irregular trapezoidal shape and the remaining cavity being of circular, hexagonal or regular polygonal shape, the cavity being concentrically arranged as regards the external cylindrical tubing, defining internal smaller sides (4) of each of the trapezoidal cavities and the internal outline (5) of the central cavity, membrane (3) separating the trapezoidal cavities from the central cavity. A procedure for the production of the multitubular device, a method for the installation thereof, a die for the production of the heptatube production, use of the multitubular device for cable housing and laying, a joint and use of the joint, preferably for the connection of multitube stretches.

22 Claims, 17 Drawing Sheets

ENTRUDED MULTITUBULAR DEVICE

This invention relates to an extruded multitubular device, particularly to a heptatubular, dodecatubular and tridecatubular one, to its use in housing and laying of cables, to the procedure and die for the production thereof, to a method for the installation thereof, to joint, and to the use of said joint.

The privatization process in Argentina gave rise to the need of laying cables, essentially Optical Fiber ("O.F."), with more than one cable at a time.

Thus, at the end of 1991 and beginning of 1992, Telefónica de Argentina required from its suppliers a tubing known as "TRITUBE FOR OPTICAL FIBER CONVEYANCE", already used in Europe since several years.

Said requirement for the installation of O.F. focused almost exclusively on this product, both from the part of Telefónica and Telecom and other contractors, which decided to operate with these products instead of using separate monotubes.

Upon the appearance of the Tritube, companies were aware of the advantage of operating multiple channels with a single installation cost. This may be seen in telephony, and in all those cases in which more than one O.F. cable or other cable of small internal diameter is to be laid. Examples include Bitubes for data transmission in Oil pipelines, Tritube in data transmission within a same company, tritube for video-cable and many other uses. At present the concept of Planar Multiple Tubes Lines of up to Four tubes (Quatertube).

On the other hand and most recently, other problems arose which required solutions.

Upon the privatizations commencement, installations in large cities were done in the open. Channeling was done by means of trenches after digging-up streets. This resulted in a very messy laying with plural interferences, and further, in the consequent inconveniences as regards transit, safety and environmental damage.

Once the authorities of the City of Buenos Aires, many municipalities of the Great Buenos Aires and other cities throughout the country were aware of the problems arising from this installation procedure, a series of much more stringent directives for the execution of new works was established, in order to promote works organization.

These directives establish that any new laying to be done must hold the corresponding municipal consent, but even then this consent does not enable the digging-up of streets or sidewalks, except for a minimum portion which corresponds to the perforation of a hole. From this perforation site, and with special equipment such as Microtunneling or similar equipment, another perforation located at a certain distance from the first is to be reached. Further, in the City of Buenos Aires at least, works must be accomplished from Monday through Friday during the night (from 8 PM to 8 AM of the following day), at present it being possible to work Saturdays and Sundays all day long. These restrictions provide that both (inlet and outlet) perforations are to be closed and perfectly signalized the moment works are interrupted.

Tunneling implies the use of non-conventional installation technologies, generally known as Trenchless Technology. This system is increasingly frequent in cities or when overcoming an obstacle, that is, cases in which installation by means of conventional technologies is difficult or even impossible. It is important to note that the material specially apt for tubing installation works by means of Trenchless Technology is High Density Polyethylene (HDPE), due to the fact that HDPE tubes are supplied in a continuous form, whether in the form of spools or lengths which are joined by butt welding and the like (as a single tubing without possible leakage points in joints), which tubes are sufficiently flexible in order to absorb trajectory changes, and exhibit an excellent impact resistance, whereby same are specially suitable for any kind of ground and they do not affect environment.

Companies in charge of laying are also required to provide for future channeling series, along with the own laying, which is to be equal to or larger than that used for their own service.

At present works involve seven monotubes with 40 mm OD each, surrounding a central tube of 64 mm OD, as per FIG. 1 schematic.

This arrangement demands tunnels at least 20% larger than those of 150 mm OD of the system, and further, in order to render the installation feasible, a backreamer must be used which operates in a scale 20–25% larger than this last diameter, and thence we need a tunneling equipment able to perform perforations with diameters larger than 225 mm.

Further, this system's particularity is that the 63 mm tube is firstly placed where the tubes assembly is strapped. At the same time, and in order to ease sliding of tubes packet within the tunnel, works are done with bentonite pumping or bentonite or polymer baths. As this system is not a mass one, it takes part of the pumped bentonite, which then remains amid the tubes. This produces expansions and contractions of the tubes packet between the strapped and non-strapped areas, increasing the assembly diameter in a discontinuous fashion.

Maximum tensile stress the tubes may support during the installation thereof is a function of the HDPE admissible stress before its yield point (yield $\sigma$) (tensile value from which material no longer exhibits an elastic behavior, with recoverable distortion, but a clearly plastic behavior, with permanent or non-recoverable distortions), and of the resistance area.

Packet resistant area can be seen in the shown schematics, but only as regards the seven external tubes.

On the other hand, the force required in order to pull the tubes packet along the tunnel, from one perforation to the other, has to be higher than the total resistance force exerted by tubes packet during the displacement thereof, and which depends from two effects: a friction effect and an effect produced by the tubes packet weight during hauling. The friction effect is a function of the friction area and a "coefficient of intrinsic friction" of the tubes packet within the tunnel and the ground which is to be traversed. The weight effect is precisely a function of the packet total weight (tubes of 40 mm diameter+lengths of 63 mm tubes+straps+water and bentonite portion remaining between the tubes) affected by a weighting coefficient.

Net friction area is all that area contacting the tunnel, i.e., the perimeter times the length of the packet to be installed. As expansions and contractions increase the "net contact perimeter" between packet and tunnel and there exists a maximum force that can not be surpassed, there also exists a maximum friction net area which may not be exceeded. Consequently, when the packet is to be hauled, any increase on the contact net perimeter demands the decrease or limitation of the maximum distance between perforations, in order that the maximum hauling force may be smaller than or equal to the maximum resistance force the tubes packet may withstand.

Accordingly, the smaller the weight of the tubes packet to be installed, the smaller the tunnel section and the smaller the resistant force of the system to be used, the lower will be the installation forces (as smaller installation equipment may be used), a longer laying may be achieved (more meters between chambers) and the installation times will be shorter.

A very convenient solution has now been find in order to achieve the final objective of installing a similar quantity of O.F. cables at a much lower cost per meter installed. This solution is the multitubular device of the present invention, particularly the heptatubular, dodecatubular and tridecatubular devices, an HDPE extruded multiple-duct which is more compact and lighter and thence exhibits a constant section.

In the attached drawings.

Figure 18:
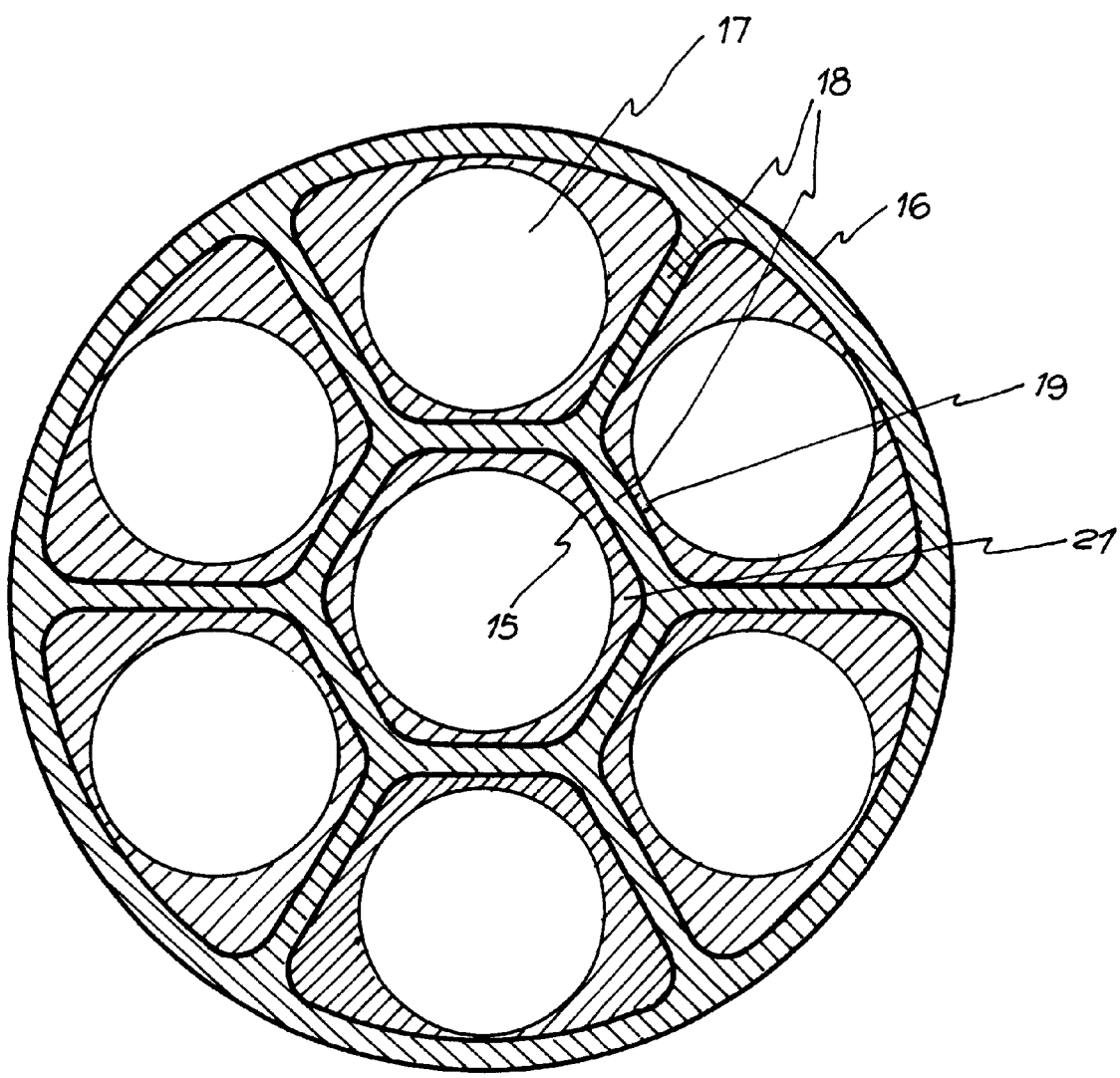
Figure 19:
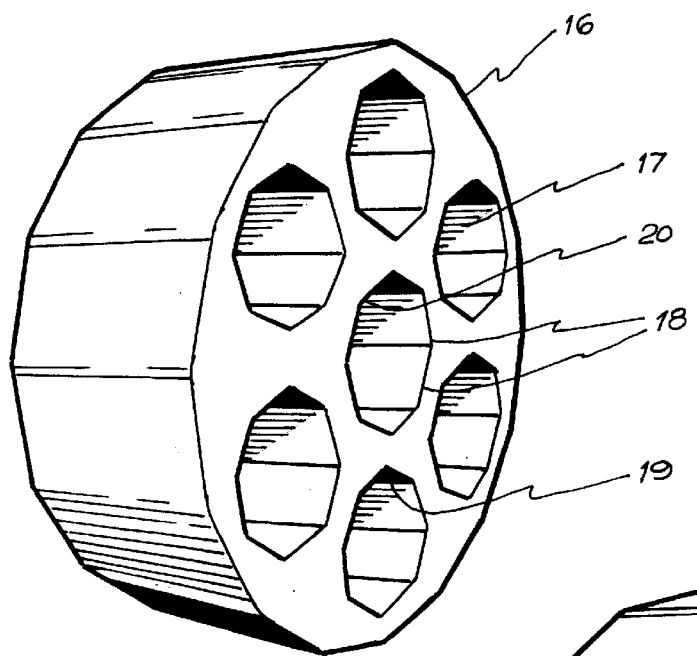
Figure 19:
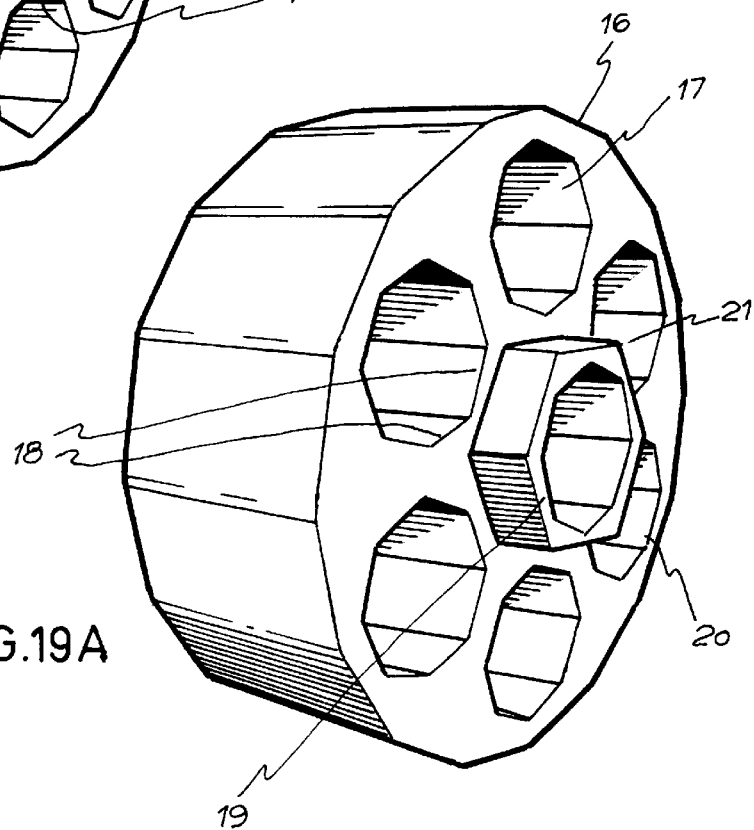
Figure 20:
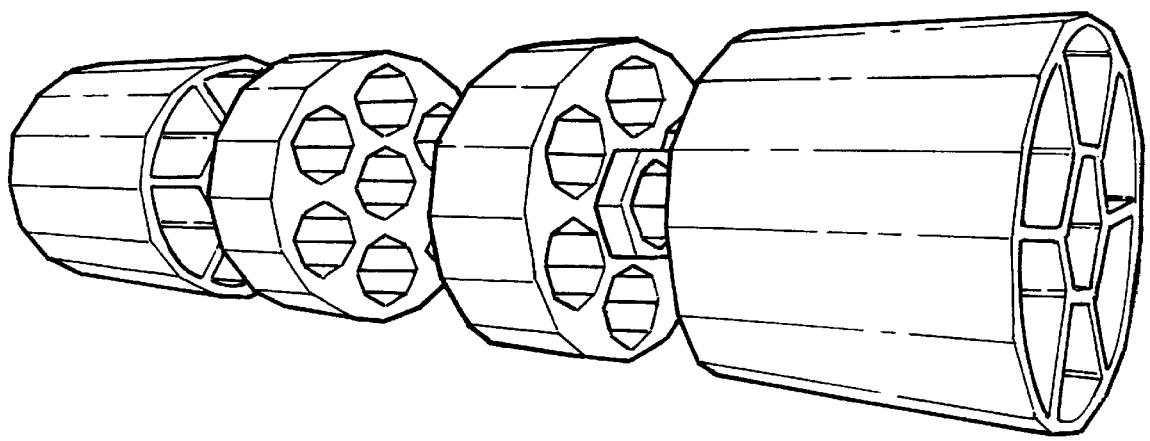
Figure 21:
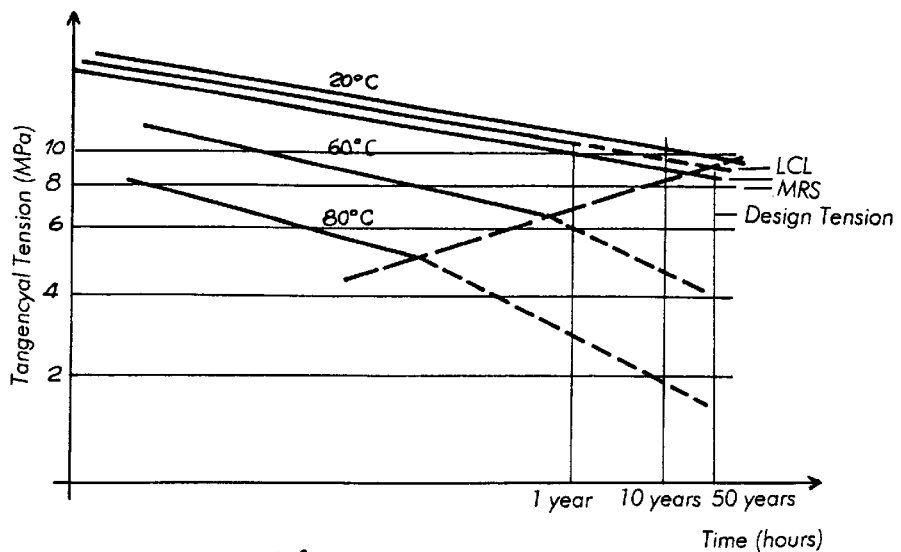
Figure 22:
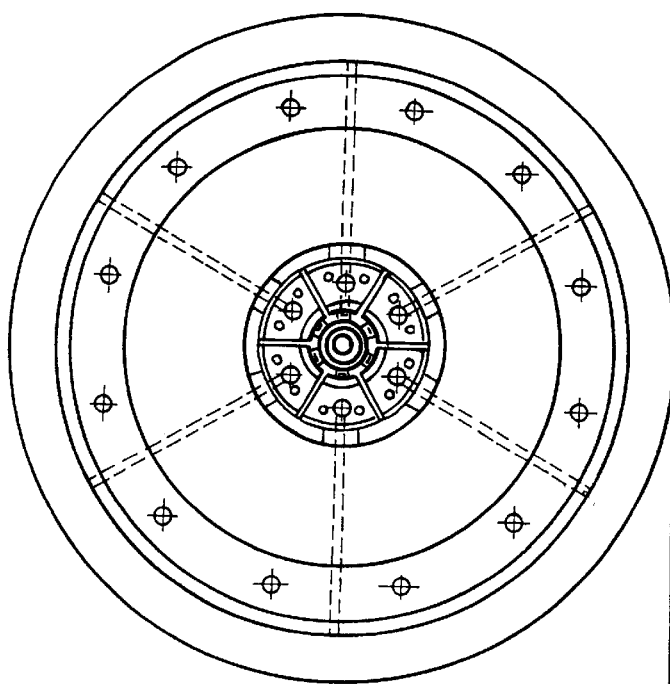
Figure 23:
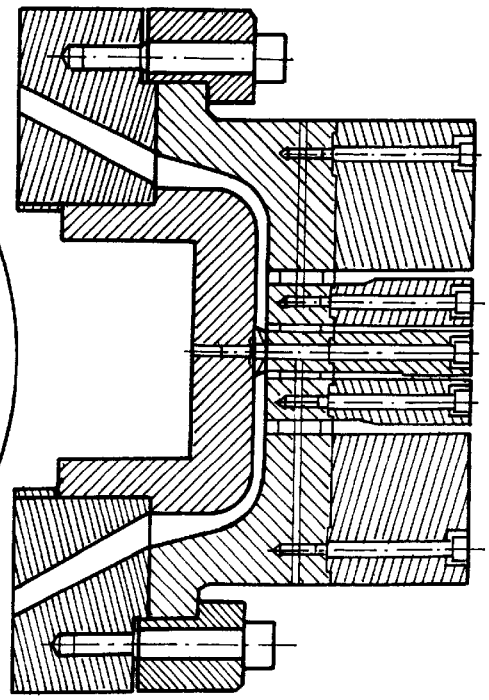

FIGS. 18, 19A, and 19B are a shematic representations of a joint of seven cavities according to the present invention;

FIG. 20 shows the manner in which the joint would be assembled in the case of eptatubes;

FIG. 21 is a graphic showing the mechanical behaviour of the material (HDPE);

FIG. 22 is a schematic representation of the die;

FIG. 23 is a schematic representation of the die with co-extruder; and

Figure 24:
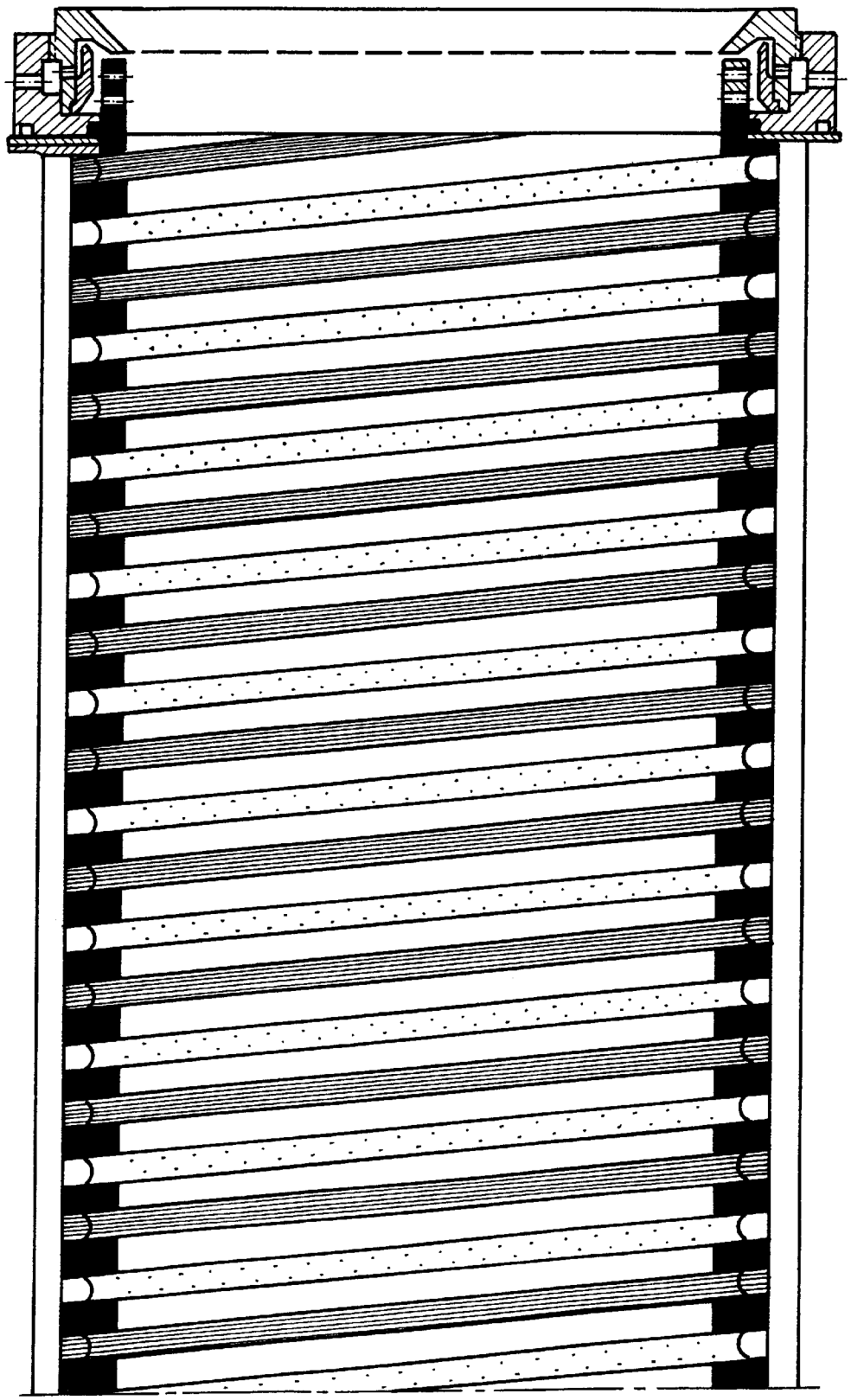

FIG. 24 is a shematic representation of the pre-calibrator.

Multitubular device consists of a multiple-duct which is supplied on spools of customized lengths (continuous system), manufactured by means of a single extrusion process which joins two concepts. On the one hand, the shape, profile or cylindrical tubing external appearance, which is processed by means of an in-line production system such as those used for conventional tubing (external diameter much smaller than that required for the simultaneous laying of the above mentioned seven tubes), and on the other hand, the longitudinally constant section profile which nevertheless exhibits internal cavities. In the heptatube particular case, it possesses seven internal cavities, each of them similar to those used in the above scheme, which are distributed according to the configuration shown in FIGS. 2–10 schematics.

Figure 6:
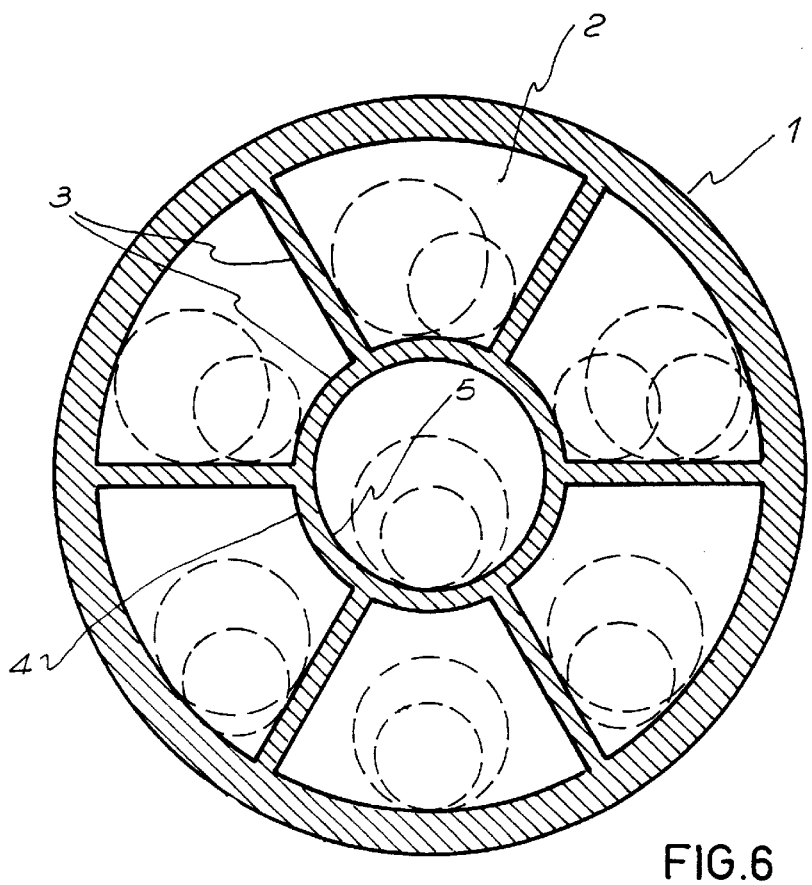
Figure 7:
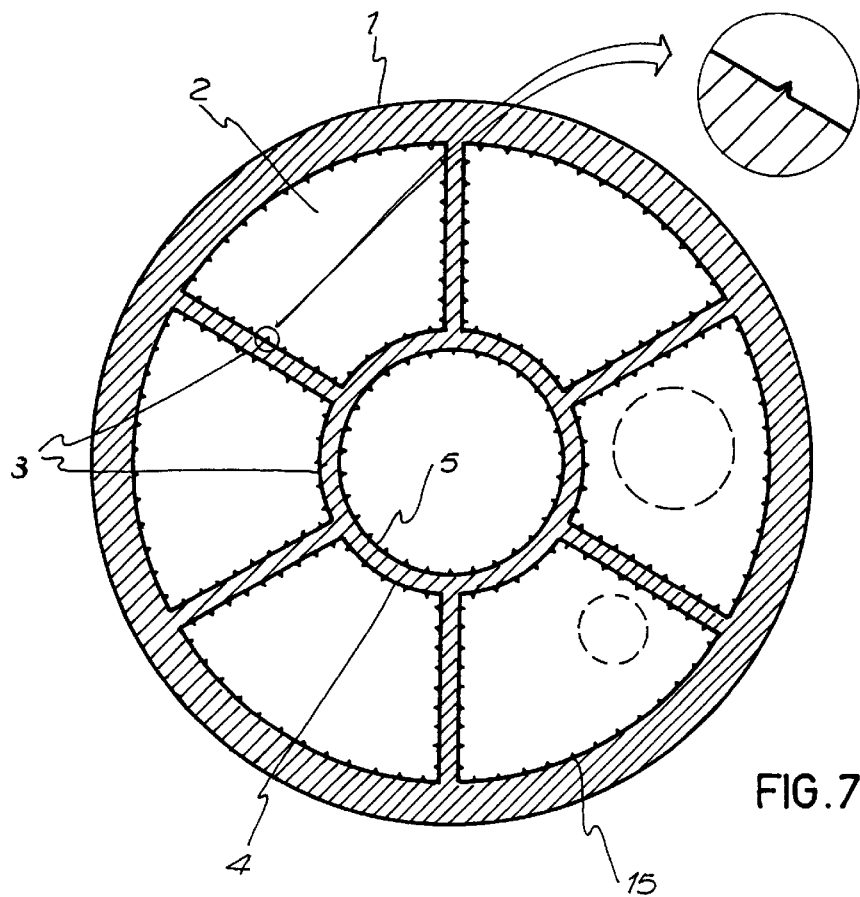
Figure 8:
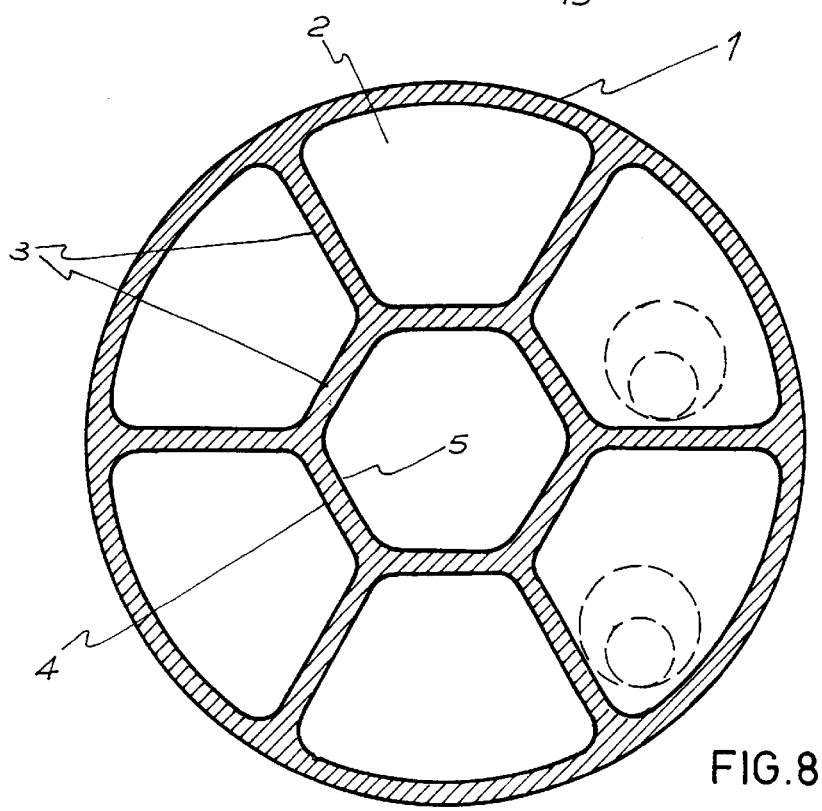
Figure 9:
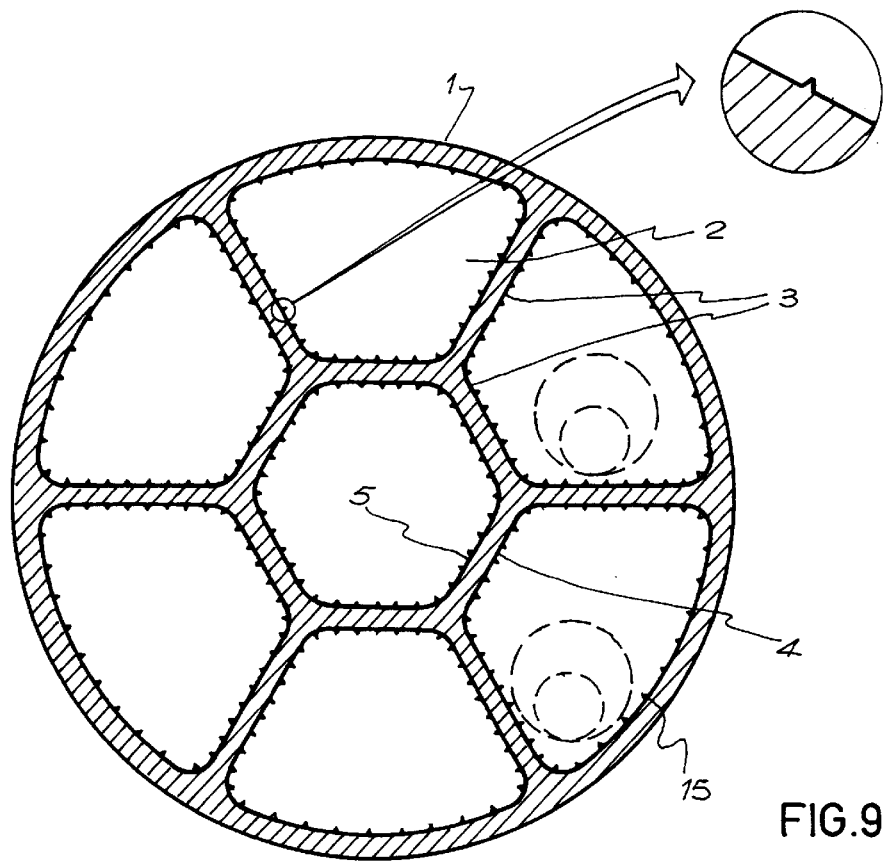
Figure 10:
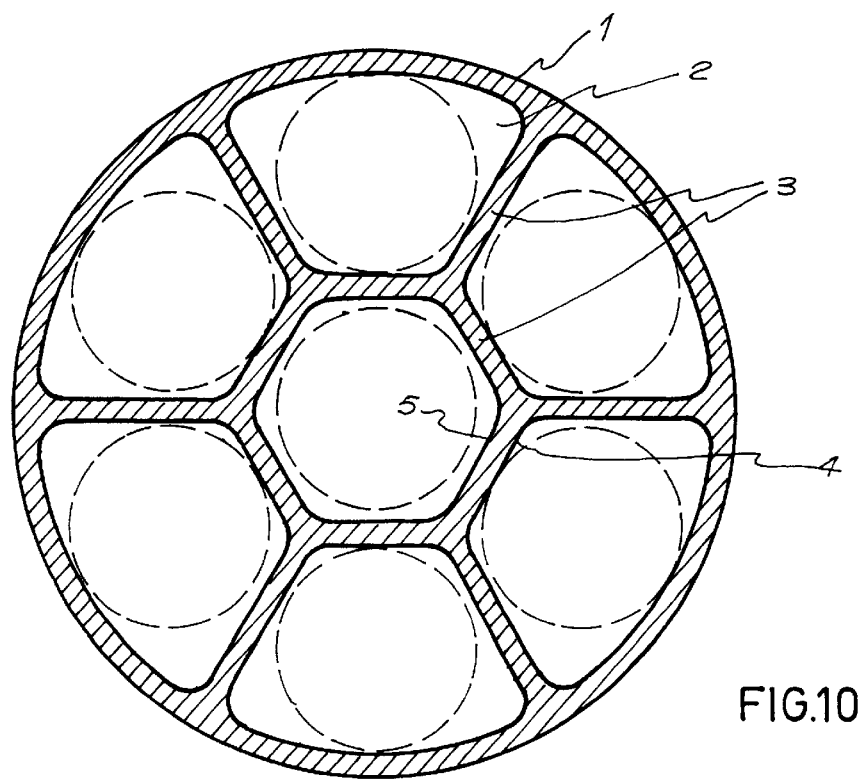
Figure 11:
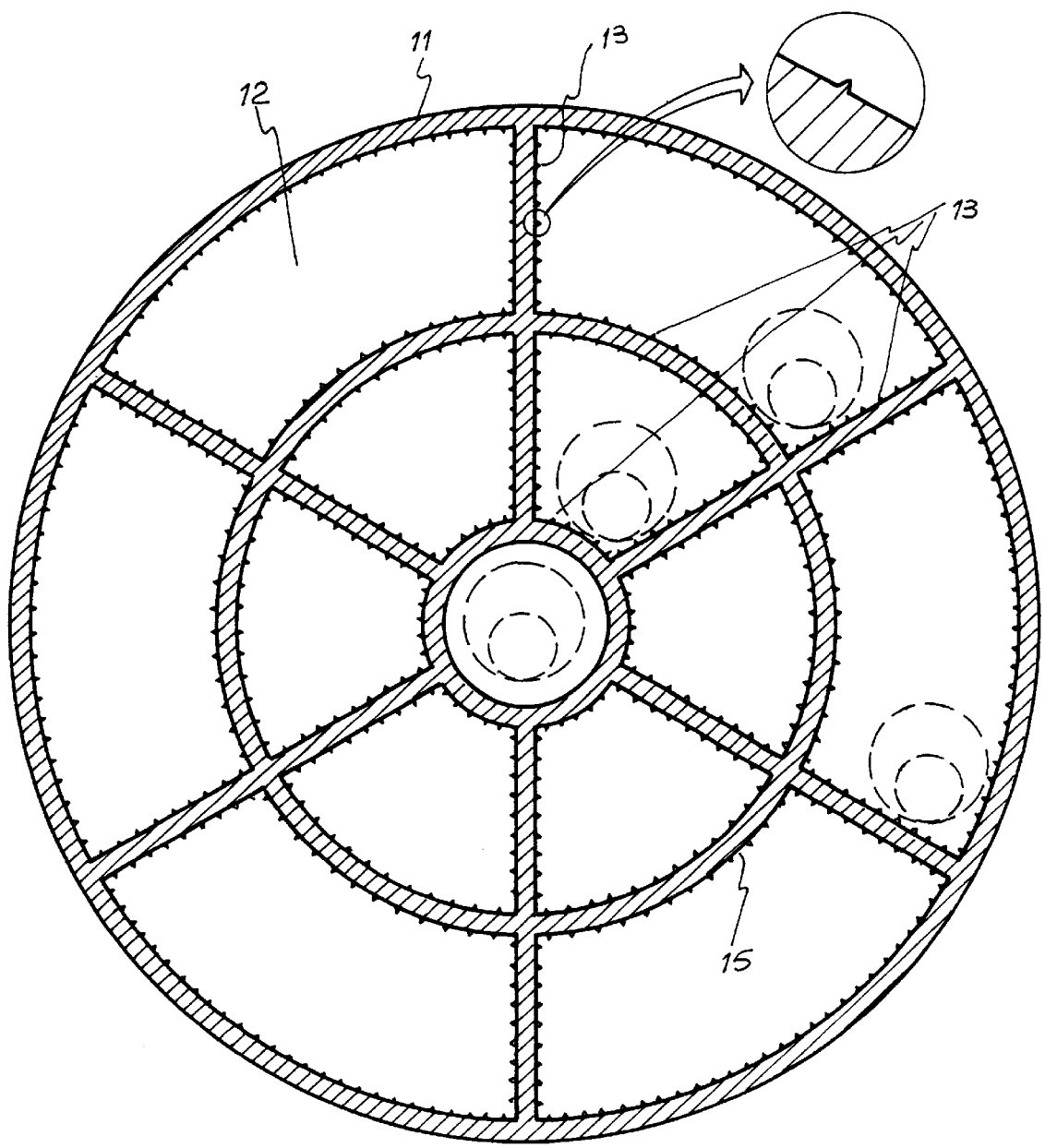
FIGS. 11 to 15 are schematic representations of tridecatubes according to the present invention.
Figure 12:
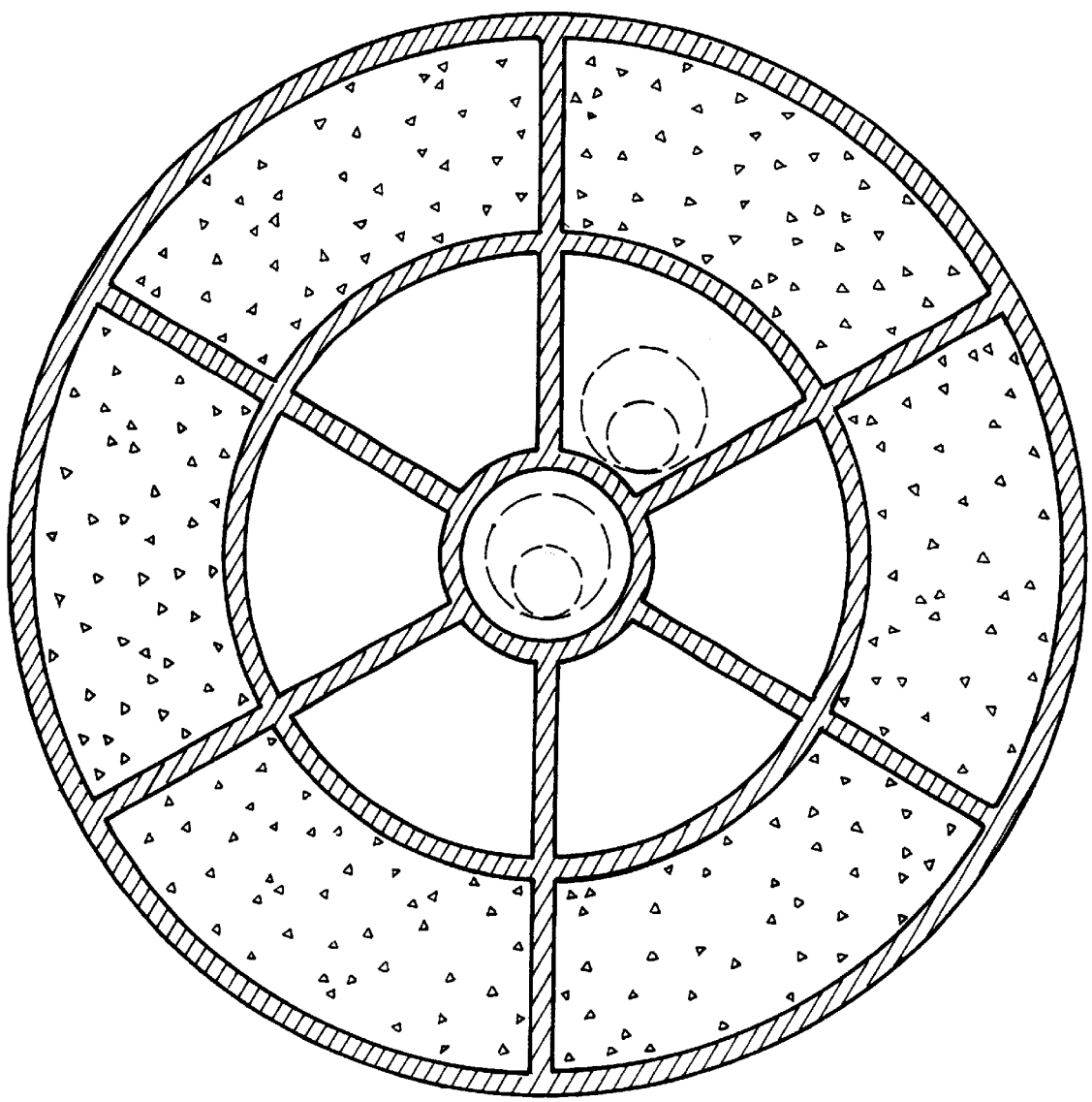
Figure 13:
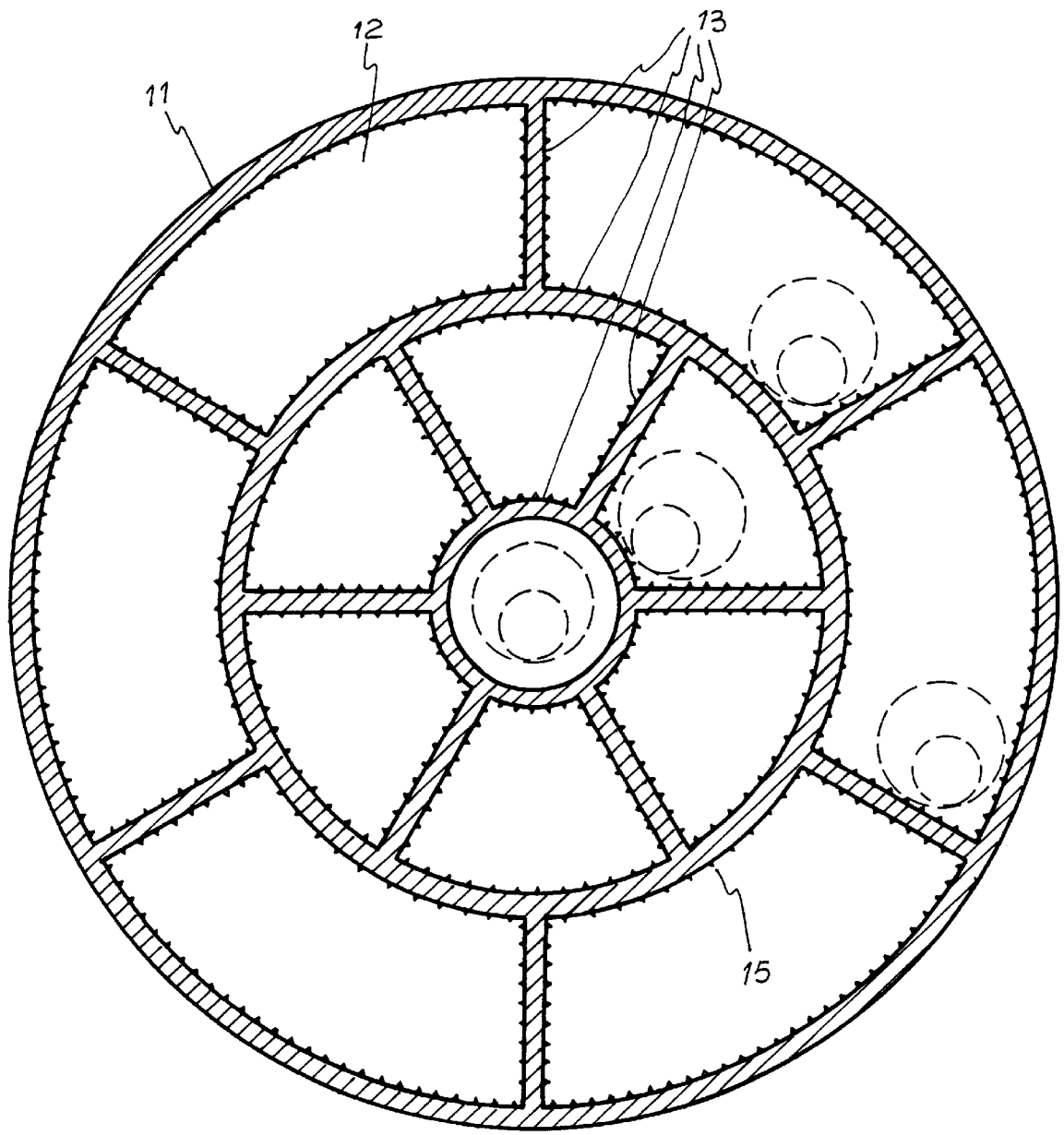
Figure 14:
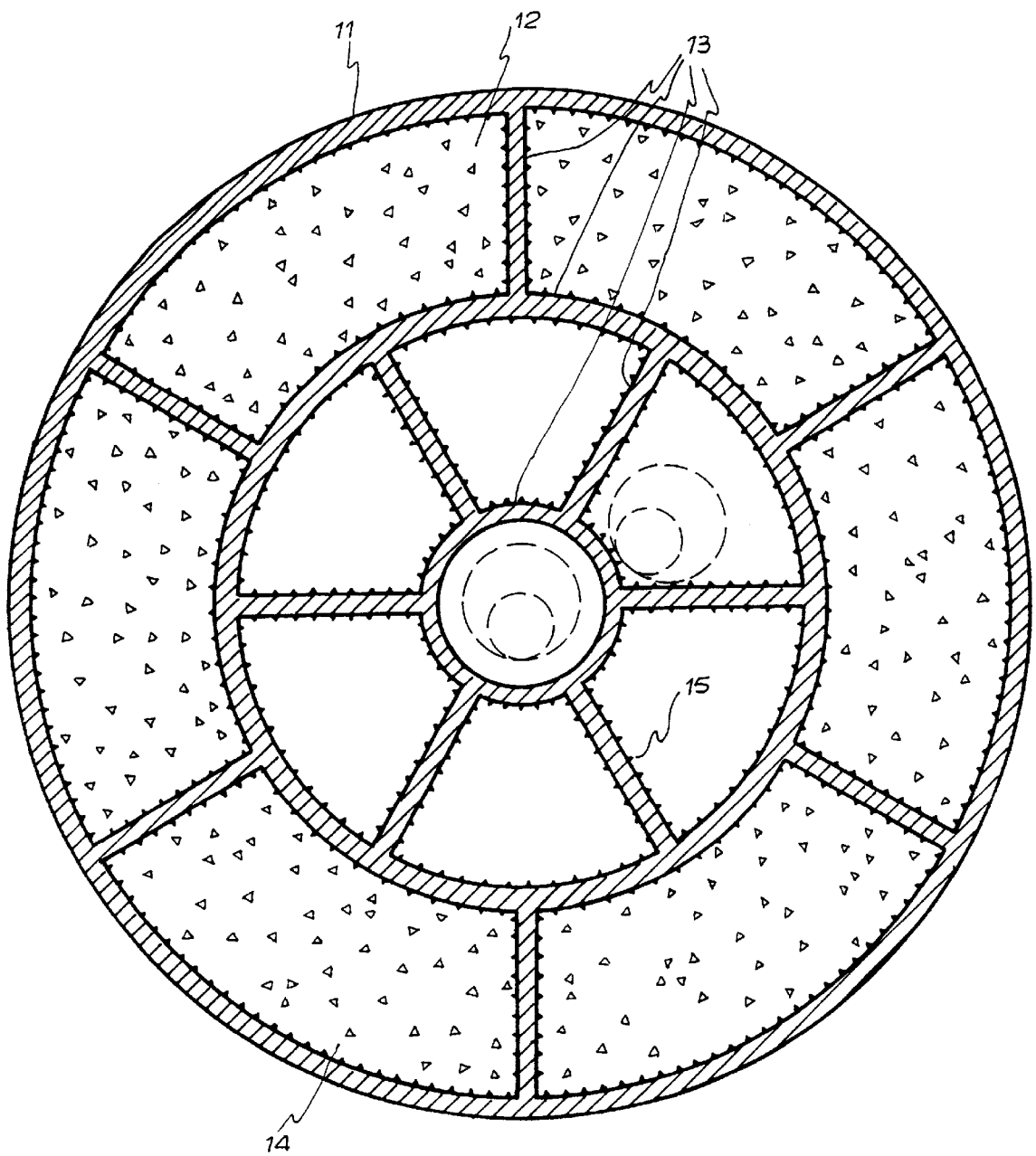

Said schematics shows the external cylindrical section shape, each one of the seven cavities and, particularly referring to FIG. 6, there can be seen the different circumferences representing Optical Fibers which may be used with the currently available maximum and minimum external diameters which are being laid in conventional tubes or others which may be developed hereinafter.

FIGS. 11–17 show dodecatube and tridecatube schematics. Also, these figures show different circumferences which represent Optical Fibers which may be used, with the currently available maximum and minimum external diameters and which are being installed in conventional tubes.

Thus, an object of the present invention is a multitubular device which comprises an external cylindrical or regular polygonal tubing which exhibits a profile of longitudinal constant or invariable section and internal cavities which are defined by separating membranes, said external cylindrical or regular polygonal tubing and said separating membranes being made of high density polyethylene (HDPE) or equivalents thereof.

Preferably, said multitubular device is a heptatube, dodecatube or tridecatube.

In the case of the heptatube, multitube comprises an external cylindrical tubing (1) which exhibits a longitudinally constant section profile with seven cavities (2) defined by separating membranes (3), six of said cavities being of irregular trapezoidal shape and the remaining one being of circular, hexagonal or regular polygonal shape, said cavity being concentrically arranged as regards said external cylindrical tubing, delimiting smaller internal sides (4) of each of said trapezoidal cavities and the internal outline (5) of the central cavity, the separating membrane (3) between said trapezoidal cavities and said central cavity, said external cylindrical tubing and said separating membranes being made of high density polyethylene (HDPE) Said references (1) to (5) are shown in FIGS. 2–10.

Preferably, in the case of the heptatube, the external cylindrical tubing has an external diameter of 110 mm±1.5 mm and an internal diameter which varies from 94 mm to 104 mm, thickness of each of the separating membranes located between trapezoidal cavities varying from 1.5 to 5.5 mm, thickness of each of the separating membranes located between trapezoidal cavities and central cavity varying from 1.5 to 5.5 mm, and the external membrane varying from 3 to 8 mm.

Preferably, in the case of the heptatube, internal regular hexagonal or regular polygonal central cavity is inscribed in a circumference which diameter varies from 36 mm to 48 mm, and in turn, said hexagonal or regular polygonal central cavity circumscribes a circumference which diameter varies from 30 mm to 42 mm; thickness of each of the membranes separating trapezoidal cavities from each other varies from 1.5 mm to 5.5 mm, and thickness of each of the membranes separating trapezoidal cavities from central cavity also varies from 1.5 mm to 5.5 mm.

Preferably, in the case of the heptatube, internal circular central cavity external diameter varies from 36 mm to 48 mm and the internal diameter varies from 30 mm to 42 mm; thickness of each of the membranes separating trapezoidal cavities varies from 1.5 mm to 5.5 mm, and thickness of each of the membranes separating trapezoidal cavities from the central cavity also varies from 1.5 mm to 5.5 mm.

Figure 1:
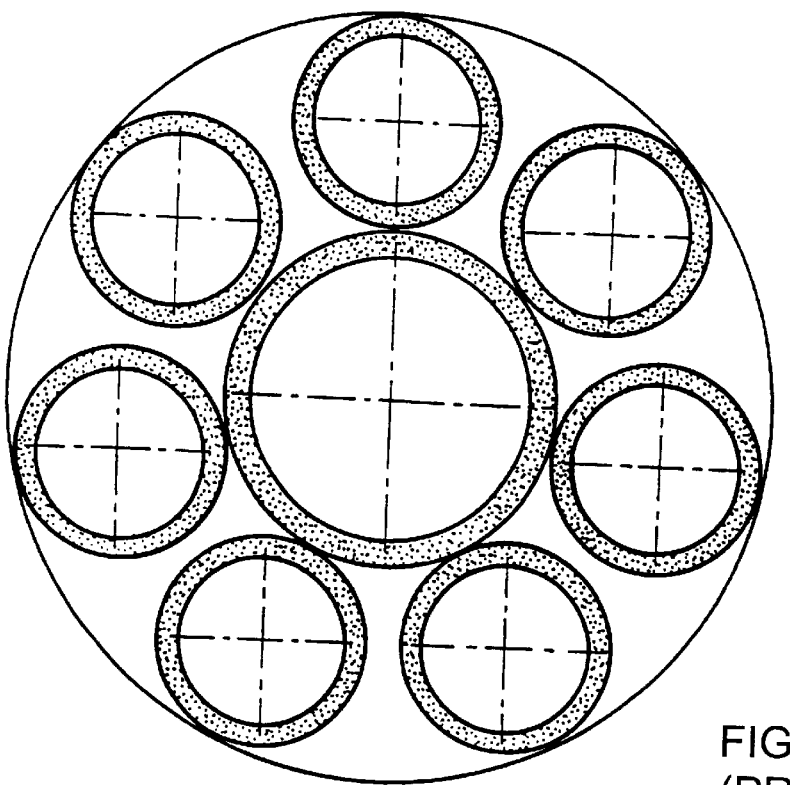
FIG. 1 is a schematic representation of prior art in which seven monotubes with 40 mm OD each, surround a central tube of 64 mm OD.
Figure 2:
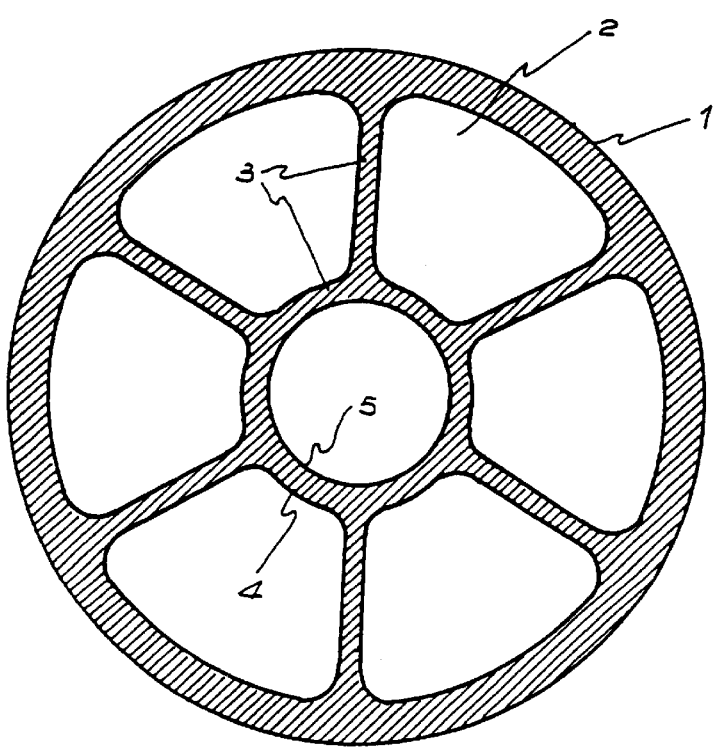
FIGS. 2 to 10 are shematic representations of hepatubes according to the present invention.
Figure 3:
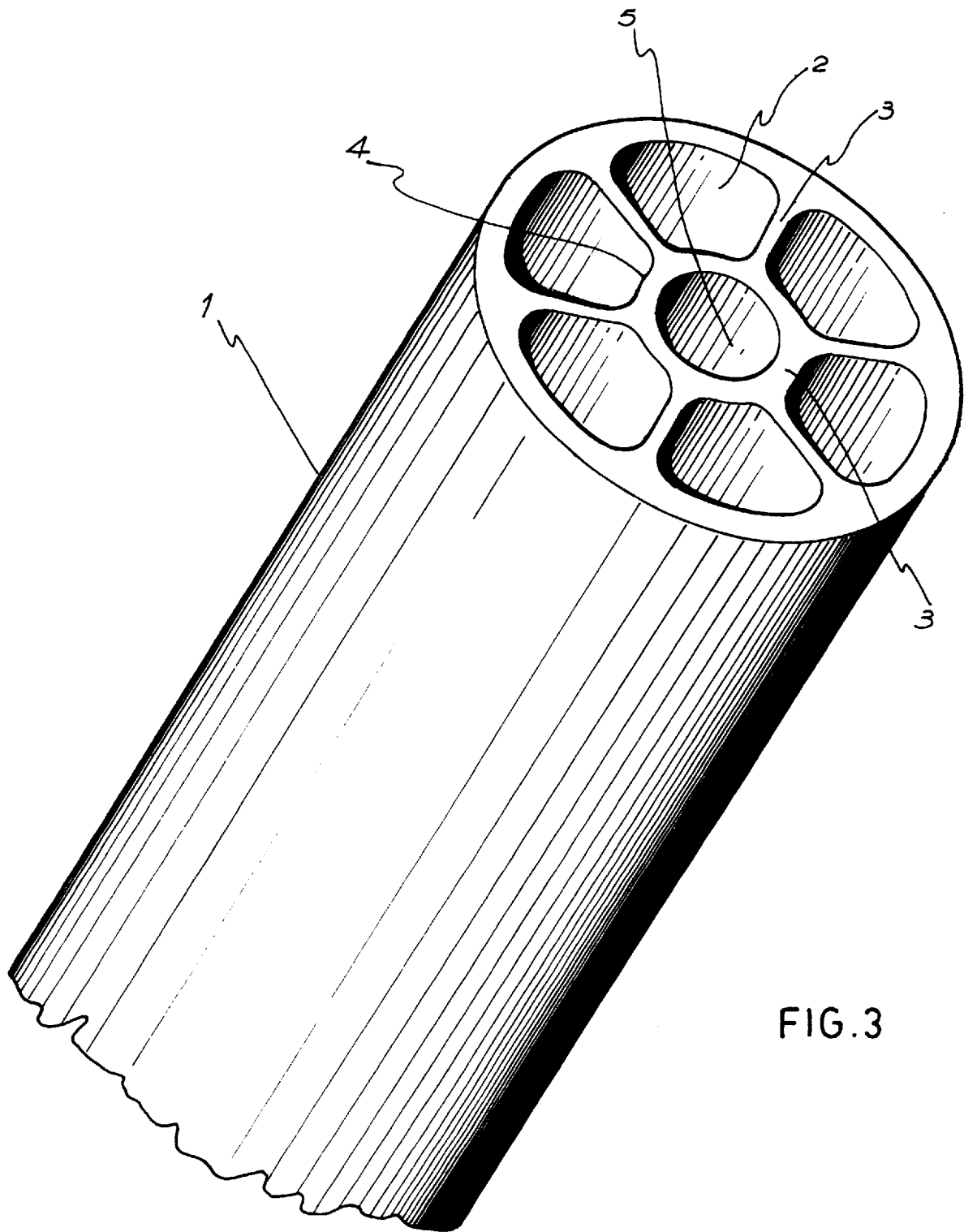
Figure 4:
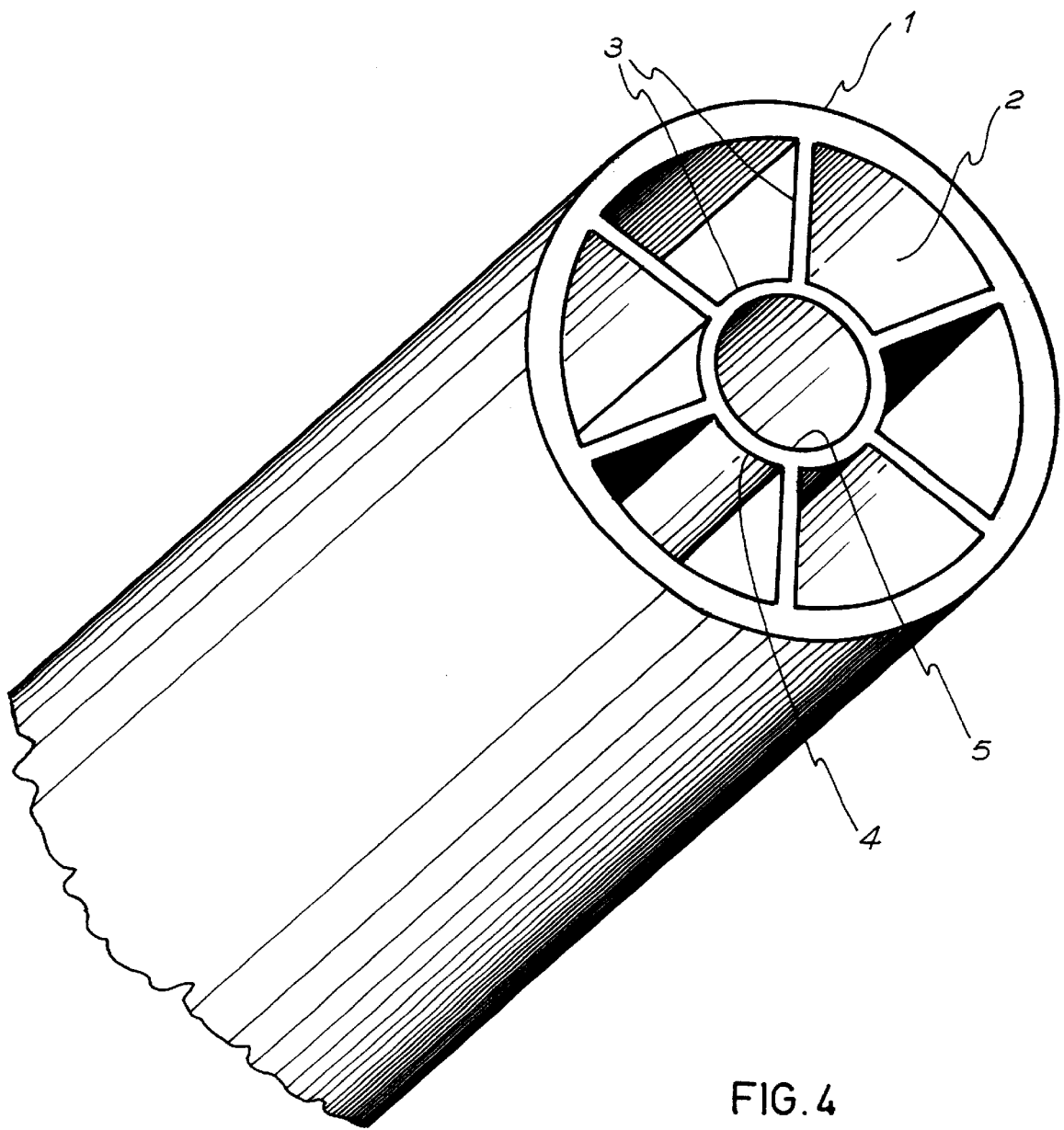
Figure 5:
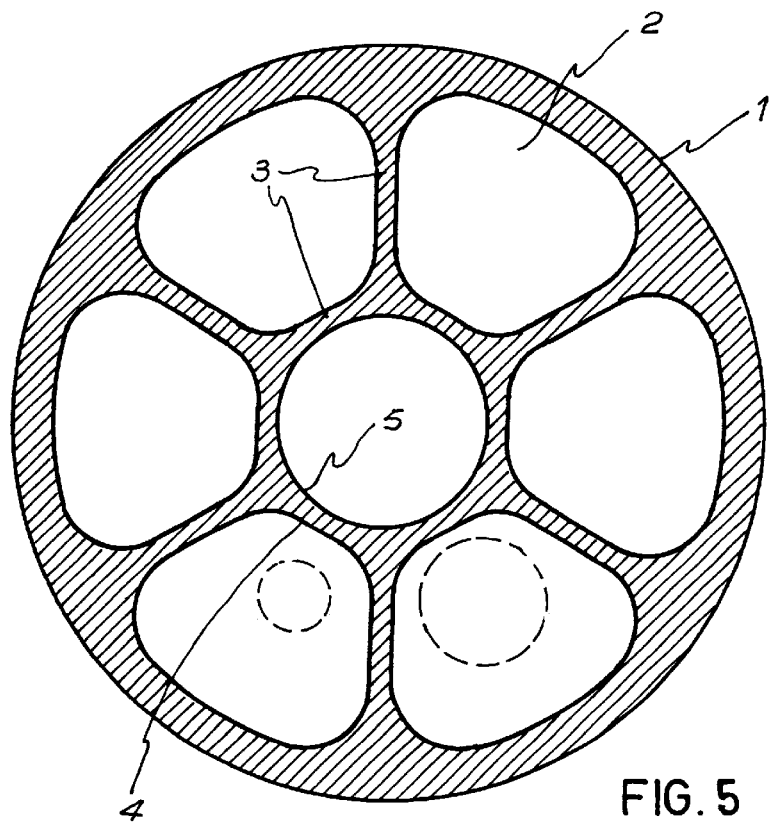

FIGS. 2 and 3, particularly, show a heptatube which comprises an external cylindrical tubing (1) which exhibits a longitudinally constant section profile and seven cavities (2) defined by separating membranes (3), six of said cavities being of equivalent area trapezoidal shape and the remaining cavity exhibiting a circular shape, the latter being concentrically arranged as regards said external cylindrical tubing, defining smaller circular sides (4) of each of said trapezoidal cavities and the internal outline (5) of the circular cavity, the separating membrane (3) located between said trapezoidal cavities and said circular cavity, said external cylindrical tubing and said separating membranes being made of high density polyethylene (HDPE).

Figure 16:
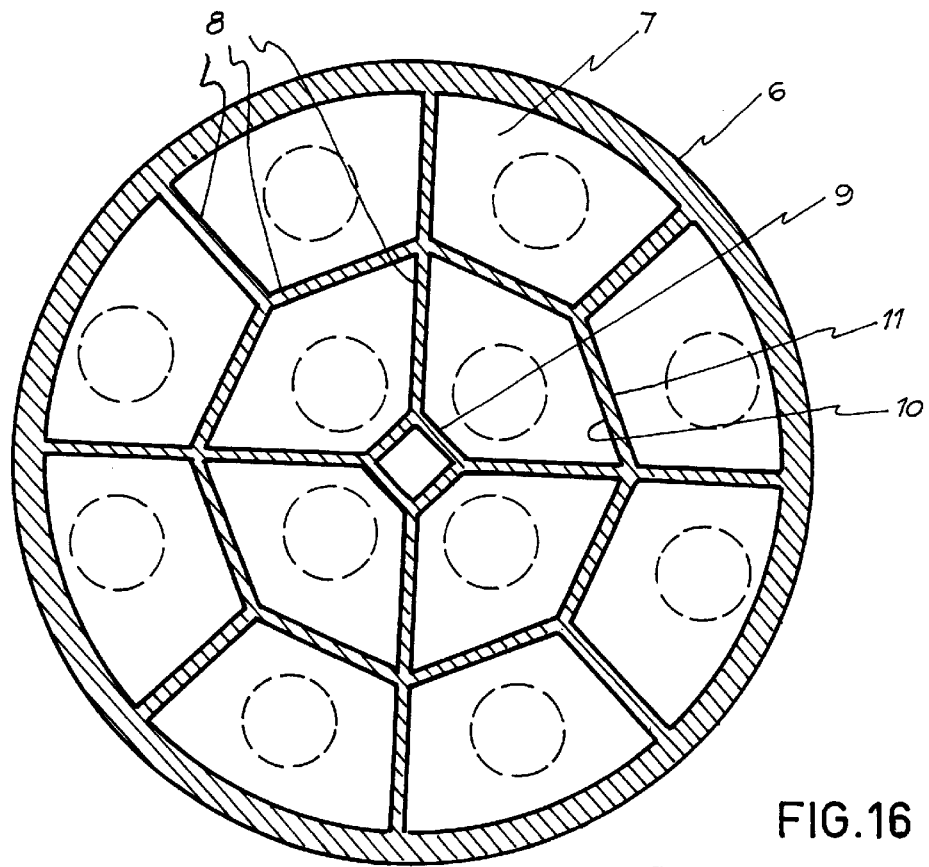
FIGS. 16 and 17 are shematic representations of dodecatubes according to the present invention.
Figure 17:
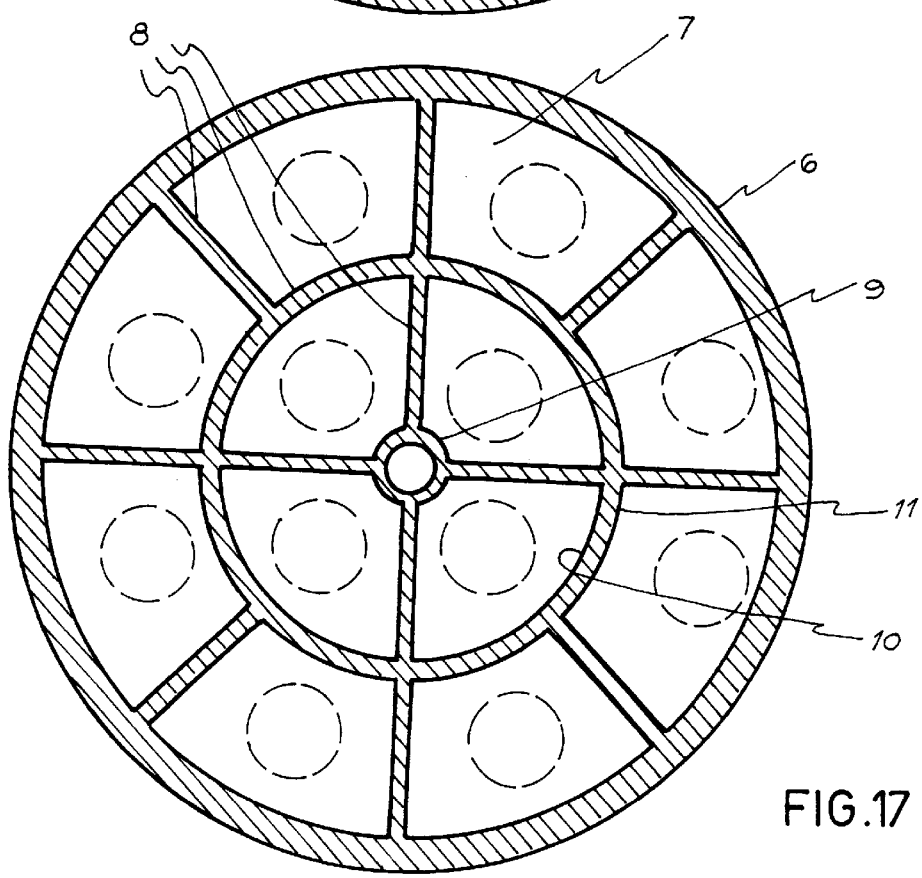

As regards the dodecatube, multitube comprises an external cylindrical tubing (6) which exhibits a longitudinal constant section profile and twelve cavities (7) defined by separating membranes (8), eight of said cavities being of irregular trapezoidal shape and the central cavity being of circular, octagonal or regular polygonal shape, said central cavity being concentrically arranged as regards said external cylindrical tubing, and said central cavity being divided in four equivalent section cavities, thus a central core (9) being conformed by the intersection of the membranes which separate from each other said four cavities in which the central cavity is divided, which central core (9) defines internal smaller sides (10) of each of said trapezoidal cavities and the internal outline (11) of the central cavity, the membrane (8) which separates said trapezoidal cavities from the central cavity, said external cylindrical tubing and said separating membranes being made of high density polyethylene (HDPE). Above mentioned references (6)–(11) are shown in FIGS. 16 and 17. Said central core only performs constructive structural functions.

Preferably, in the case of the dodecatube, external cylindrical tubing has an outer diameter of 160 mm±3 mm and an inner diameter of from 144 to 154 mm; thickness of separating membranes located between trapezoidal cavities varies from 1.5 to 5.5 mm, and thickness of membranes separating trapezoidal cavities from the central cavity varies from 1.5 to 5.5 mm.

Preferably, in the case of the dodecatube, internal octagonal or regular polygonal central cavity is inscribed within a circumference which diameter varies from 66 mm to 84 mm, and in turn, said central octagonal or regular polygonal cavity circumscribes a circumference which diameter varies from 63 mm to 81 mm; thickness of each of the membranes separating trapezoidal cavities from each other varies from 1.5 mm to 5.5 mm, and thickness of membranes separating trapezoidal cavities from central cavity also varies from 1.5 mm to 5.5 mm; and thickness of membranes separating central cavities divisions varies from 1.5 to 5.5 mm.

Preferably, in the case of the dodecatube, internal central circular cavity external diameter varies from 66 to 84 mm and the internal diameter thereof varies from 63 to 81 mm; thickness of each of the membranes separating trapezoidal cavities varies from 1.5 mm to 5.5 mm; thickness of each of the membranes separating trapezoidal cavities from central cavity also varies from 1.5 mm to 5.5 mm; and thickness of membranes separating central cavities divisions varies from 1.5 to 5.5 mm.

In the case of the tridecatube, multitube comprises an external cylindrical tubing (11), which exhibits a longitudinal constant section profile with thirteen internal cavities (12), defined by separating membranes (13); twelve of said internal cavities are arranged in an annular manner with respect to the circular, hexagonal or regular polygonal central cavity; the first ring which is concentric with respect to the central cavity has six trapezoidal cavities defined by separating membranes (13) located between them, the central cavity and the external ring cavities; the second ring or external ring is comprised of six trapezoidal shape cavities, defined by separating membranes (13) located between them, the external circular membrane and the cavities of the first ring, said external cylindrical tubing and said separating membranes being made of high density polyethylene (HDPE). Membranes separating trapezoidal cavities from each other and the external ring cavities from each other are aligned (FIGS. 11 and 12) or alternate (FIGS. 13 and 14), external ring cavities may be injected with cementitious mortar (14) (FIGS. 12 and 14) in order to generate the mechanical protection of internal ring cavities and central cavity. Above mentioned references (11) to (13) are denoted in FIGS. 11 to 14. Reference (14) is denoted in FIGS. 12 and 14.

Preferably, in the case of the tridecatube, external cylindrical tubing shows an external diameter of 160 mm±3 mm, and an internal diameter which varies from 144 to 154 mm; thickness of each of the membranes separating trapezoidal cavities from each other varies from 1.5 to 5.5 mm, and thickness of membranes separating each of the trapezoidal cavities from each other and from the central cavity varies from 1.5 and 5.5 mm.

Preferably, in the case of the tridecatube, internal hexagonal or regular polygonal central cavity is inscribed in a circumference which diameter varies from 26 mm to 40 mm, and in turn, said hexagonal or regular polygonal central cavity circumscribes a circumference which diameter varies from 22 mm to 36 mm; thickness of each of the membranes separating trapezoidal cavities varies from 1.5 mm to 5.5 mm; thickness of each of the membranes separating trapezoidal cavities from each other and from the central cavity also varies from 1.5 mm to 5.5 mm, and membrane separating internal and external ring from each other varies from 1.5 to 5.5 mm.

Preferably, in the case of the tridecatube, internal circular central cavity has an outer diameter which varies from 26 mm to 40 mm and an internal diameter which varies from 22 mm to 36 mm; thickness of each of the membranes separating trapezoidal cavities from each other varies from 1.5 mm to 5.5 mm; thickness of each of the membranes separating trapezoidal cavities from central cavity also varies from 1.5 mm to 5.5 mm, and membrane separating internal ring from external ring varies from 1.5 to 5.5 mm.

Another embodiment of the multitube according to the present invention is a tridecatube which consists of a multitube exhibiting an external cylindrical tubing (22) which shows a longitudinally constant section profile and thirteen internal cavities (23) defined by separating membranes (24), twelve of which cavities are arranged in an annular manner as regards the circular or regular polygonal central cavity, said twelve cavities being of irregular trapezoidal shape; said central cavity is concentrically arranged as regards said external cylindrical tubing, defining internal smaller sides (25) of each of said twelve trapezoidal cavities and the internal outline of said central cavity (26), membrane (24) separating said trapezoidal cavities from each other and from the central cavity; said external cylindrical tubing and said separating membranes being made of high density polyethylene (HDPE).

Figure 15:
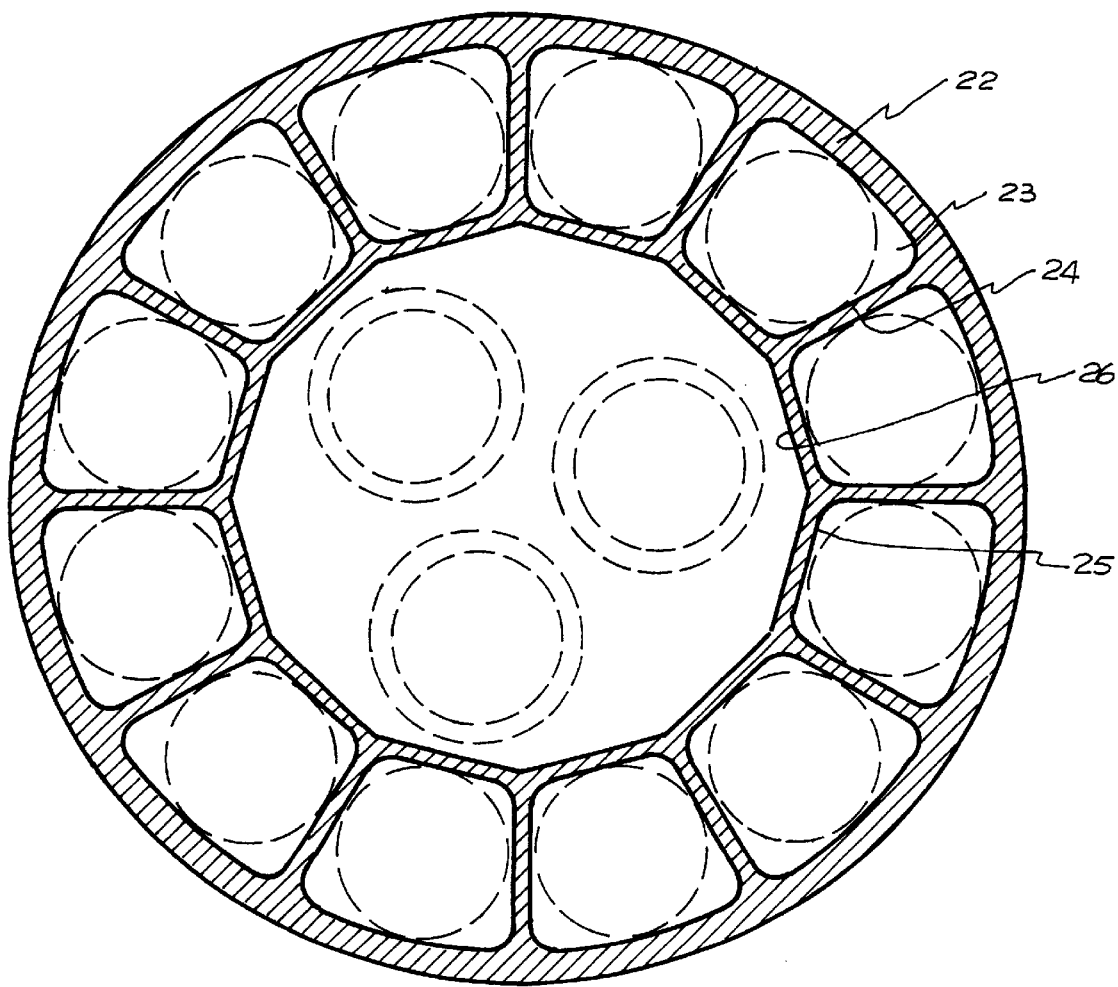

Above references (22) to (26) are denoted in FIG. 15, referring in this case to the tridecatube; cylindrical tubing outer diameter is 160 mm±3 mm and internal diameter varies from 144 to 154 mm; thickness of each of the membranes separating trapezoidal cavities varies from 1.5 to 5.5 mm; thickness of the membranes separating trapezoidal cavities from central cavity varies from 1.5 to 5.5 mm; and external membrane varies from 3 to 8 mm.

Preferably, in the case of the tridecatube, internal regular polygonal central cavity is inscribed in a circumference which diameter varies from 89 to 95 mm, and in turn, said regular polygonal central cavity circumscribes a circumference which diameter varies from 84 to 90 mm; thickness of each of the membranes separating trapezoidal cavities varies from 1.5 to 5.5 mm, and thickness of each of the membranes separating trapezoidal cavities from central cavity also varies from 1.5 to 5.5 mm; said cylindrical tubing and said separating membranes being made of high density polyethylene (HDPE), thus conforming a 13 cavities device (tridecatube).

Preferably, in the case of the tridecatube, the internal circular central cavity exhibits a diameter varying from 89 to 95 mm and a diameter varying from 84 to 90 mm; thickness of each of the membranes separating trapezoidal cavities from each other varies from 1.5 to 5.5 mm, and thickness of each of the membranes separating trapezoidal cavities from central cavity also varies from 1.5 to 5.5 mm; said cylindrical tubing and said separating membranes being made of high density polyethylene (HDPE), thus conforming a 13 cavities device (tridecatube).

Preferably, internal diameter, inscribed in trapezoidal cavities, is of 32 mm±3 mm.

In order to reduce the internal friction which is produced by the cables laying within multitube's cavities, a self-lubricating technique may be incorporated, such as that involving scrapping of internal surface of said multitube's cavities, whereby the contact surface is reduced to precise contacts, thus effectively reducing friction forces and enabling lower tensile stresses during the fiber laying, which fact implies that longer stretches of cables may be laid, without splices and/or intermediate pulling points. This condition restores drawing capacity to cables and/or fibers to be laid, this being a significant advantage regarding the use for which same are intended. Thus, internal surfaces of the inventive multitube cavities may optionally exhibit grooves or slots (15) (see, for instance, FIGS. 7, 9, 11, 13 and 14).

Further, the possibility of a central cavity adopting circular, hexagonal, or regular polygonal shape provides several options which generate even better advantages as regards the contact points of cables or fibers to be laid in the central cavity.

Further, above mentioned geometrical configuration allows a higher structural and mechanical rigidity which results in a higher tensile strength, and also increases the capacity of withstanding external loads during different laying conditions as compared to similar area sections constructed with individual tubing.

Together with this optimization process of the inventive product's own capacity, there have been achieved, through the variability of internal and external separating membranes thickness, an improvement of the product cost and a higher adaptability against the various internal pressures the tube is to be subject to during the cables and fibers laying or upon the action of pulling elements and the installation of the duct itself.

Combination of these alternatives and the geometrical variations as regards the multitube's section offers a series of possibilities which may be correctly adapted to different installation specifications of multitube and/or cables or fibers within same, thus assuring a most reasonable technical-cost balance according to the product use and purpose.

Also having in mind environmental regulations which affect heptatube use and surroundings, the purpose has been to provide, through its geometrical section optimization, a product contemplating and optimizing such situation as arises when a joint installation of more than one multitube is required.

As technical, economic and environmental advantages provided by multitube (heptatube) are restrained when a higher capacity of cables or fibers are required within a same line, it was necessary to increase carrying capacity providing, in this case, further options including twelve and thirteen holes, namely, dodecatube and tridecatube and the above mentioned variable capacities of the latter.

Results are translated into a higher cables or fibers carrying capacity, the possibility of injecting cementitious mortar into the external ring in order to increase mechanical protection against the action of external loads, increasing structural rigidity and, mainly, reducing the space otherwise occupied by more than one multitube of 110 mm, by means of a multitube with an external diameter of 160 mm. This geometrical model's advantage is that it reduces the diameters of those perforations required for the multitube installation through trenchless techniques. When this model incorporates specifications already described as regards a 110 mm multitube, aptitudes are enhanced and there results an improvement of the technical-economical-environmental balance, thus assuring the optimization of the selection of the most appropriate section as regards the end use and destination.

Another advantage consists of the handling and transport costs, and different models result in different sections of internal cavities, improving adaptability thereof and easiness of internal laying of cables or fibers, which constitutes one of the essential objects of the present invention.

Accompanying drawings define and supplement the proposed descriptions and are an essential part of the inventive multitubular product. Development as from the broader use of this product will produce a continuing improvement as regards the geometrical design thereof, and thence there are included within same all of the possibilities and combinations of cavities quantities, thickness of the separating membranes and relative arrangement within the circular section comprised by the multitubular product.

On the other hand, once we have the longitudinally constant section multitube, which provides seven or more cavities able to convey cables or fibers in the interior thereof, tube stretches are to be joined.

The above is to be achieved by means of a minimum perforation and a minimum sacrifice of the useful section of each cavity.

The inventive joint accomplishes several functions, namely:

It enables the union of two tube sections, whether by mechanical union and/or thermo- or electrofusion techniques.

It enables the generation of a transition part onto individual monotubes, thus allowing the generation of protected branches.

It enables the utilization and adaptation of blowing tools and devices and cable and or fiber conveyance devices.

It enables the conveyance of cables within cavities without reducing useful section and with the necessary outlets.

It bears an own structural resistance and does not generate an excessive widening of the external diameter, facilitating laying by means of trenchless techniques.

It provides for the cavities continuous alignment and specially, during joining thereof.

It is adaptable and two joints may be combined in order to produce a clear splice which may be placed in factory at the ends of each stretch.

It does not require highly skilled workers for its utilization.

Preparation and joining times are minimum and do not affect installation times, generating another element as regards the economics of installation.

As regards its geometrical configuration, it comprises a transition cylindrical piece, which provides the transition from trapezoidal to circular sections of equivalent diameter, and it is easily adapted by means of a progressive transition from one shape to the other.

Its external diameter is significantly larger than that of the tube to be joined, in order to allow for the identification thereof and also, for the welding run backing generated during the fusion process.

It possesses a circular, hexagonal or polygonal centering element which keeps alignment and prevents relative displacement of cavities.

Internal circular sections are end-chamfered in order to allow for a slow and gradual transition.

Edges of those parts of each section involved in the fusion process are adapted in order to prevent potential welding runs from affecting free circular section.

It further bears a simple alignment and fitting mechanism between two terminals or joints which allows for the union of pre-assembled ends in order to align circular sections.

Joint length shall be configured according to the use or purpose. It may be used as terminal, branching, stretches connection, head, etc.

All of the uses and cavities quantities combinations may be joined together, thus generating a significant adaptability of the joining system and terminals described as product.

It is novel inasmuch as it resolves a present problem, consisting of the union of irregular cavities tubes by means of the transition of circular sections and ensuring the alignment thereof in order to prevent obstruction of the section. Further, it particularly applies to multitubes.

It may also be used as head of an equivalent external diameter tube, thus generating a perfect distribution of cables within a duct. Its special and novel function is the possibility of allowing irregular cavities multitubes joining.

It is another object of the invention a joint which comprises an external tubing with longitudinal internal cavities defined by separating membranes, the internal central cavity being surrounded by a membrane which conforms an alignment and fitting which is in a parallel plan as regards the plan of the remaining cavities, membranes and external tubing, said external tubing, said separating membranes and said alignment and fitting being made of high density polyethylene (HDPE). Particularly, said piece may comprise 7 cavities as represented by FIGS. 18, 19A and 19B. In this case, joint comprises an external tubing (16) with seven longitudinal internal cavities (17) defined by separating membranes (18), six of said cavities exhibiting a trapezoidal to circular transition shape and the remaining cavity exhibiting a circular, hexagonal or polygonal shape, said cavity being concentrically arranged as regards said external cylindrical tubing, defining the internal outline (19) of each of said cavities of trapezoidal to circular transition shape and the internal outline of the central cavity (20), the membrane (18) separating said cavities of trapezoidal to circular transition shape and said central cavity, the internal central cavity being surrounded by a circular, hexagonal or polygonal membrane which conforms an alignment and fitting element (21) which is in a parallel plan as regards the plan of the remaining cavities, membranes and external tubing, said external cylindrical tubing, said separating membranes and alignment and fitting element being made of high density polyethylene (HDPE). Above mentioned references (16) to (21) are denoted in FIGS. 18, 19A and 19B.

Said alignment and fitting element is at one or both sides of the joint.

FIG. 20 shows the manner in which the joint would be assembled in the case of heptatubes.

There follows a brief description of the material to be used (HDPE), production process, with its known and novel or original stages, its installation process and the convenience thereof in new technologies (as the trenchless case), and possible fields of use.

High Density Polyethylene (HDPE) is a polymer obtained from the "polymerization" chemical reaction from ethylene. When only ethylene molecules intervene, there are obtained homopolymer polyethylenes.

Other olefines may intervene such as butene, hexene, octene types, etc., which result in copolymer polyethylenes based on butene, hexene, etc.

Thus,

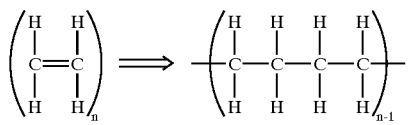

This reaction takes place because ethylene links C=C (double link) are less stable than polyethylene C—C links.

This is not a simple process. In order for it to be successful, operations shall be performed under certain pressure and temperature conditions, and in the presence of special catalysts (chemical agents which favor and accelerate a chemical reaction).

Reaction takes place in chemical (petrochemical) reactors, and the reaction product is not always the same.

Not all of the molecules formed have the same length and the same conformation. Not always they polymerize in a single direction, there may be a competitive reactivity with H atoms, which would produce branched structures. End, thermal, physical, mechanical properties will depend on the existent chemical process.

These properties will strongly depend on parameters which characterize polymers, such as density, polymer average molecular weight and average molecular weight distribution.

Polyethylenes (PE) are classified, as regards density, as:

| | | |
|---|---|---|
| Type I | (Low density PE - LDPE) | $\rho \leq 0.93$ g/cm$^3$ |
| Type II | (Medium density PE - MDPE) | $0.93$ g/cm$^3 < \rho \leq 0.94$ g/cm$^3$ |
| Type III | (High density PE - HDPE) | $0.94$ g/cm$^3 < \rho$ |

In the past only LDPE's were used in tubings. As improved polymerization processes were developed, improvements were achieved in polyethylene properties by increasing density and, mainly, by increasing average weight (AMW) thereof.

PE molecules are joined together by means of physical mechanisms. Links between C atoms allow them to rotate and form angles lower than 180°. This allows molecules or molecules chains to interlace and twist among them, which fact confers them different properties, both in solid state and in molten state.

Phase changes in polymers are not as pronounced as in the case of smaller molecules (such as in the case of water to ice or vice versa). In this, not only average size of molecules (AMW) participates but also size distribution thereof (ASD); whether they are homopolymers or copolymers, and in this case, the starting monomer. Thence, there is not a single melting point but rather, a range of melting points.

In this aspect, one of the important properties to be determined is that known as Glass Transition Temperature, $T_g$. This property is determined by following sharp modifications in, for instance, PE specific volume or Heat Capacity. There is a change in the curve slope, and the point at which the two slopes intersect determines the $T_g$.

The significance of this Temperature, which in the case of PE is of approximately −80° C., is that under said temperature material behavior is that of a glass. Molecules and molecular chains have not much mobility and elasticity. Molecules being so close one to the other, there exists a strong attraction force between them, which fact limits the relative movement. A strong energy is required in order to deform same. In this state, properties are not time-dependent.

At temperatures higher than $T_g$, material performs as an elastomer—a highly viscous molten material. Properties thereof are time-dependent.

As regard simple or pure materials, when tension is applied thereto, they are subject to a deformation which is linear up to a certain extent, and the material particularity is that, when said tension is withdrawn, it returns to its original position. This behavior is elastic, it follows a Law known as Hooke Law, which asseverates that the relation or quotient of tension to deformation is a constant for each material, known as Material Elastic Module, E.

As regards polymers generally and PE particularly, there is not only an elastic behavior up to certain point, i.e. Yield Point, or Elastic Limit, but molecules have a plastic behavior when tension which originates deformation increases. This means that material will continue deforming because of the higher tension effect, originating a non-reversible viscous fluid.

In the first part, there exists a stretching of chains' C—C links, but at > tension, there begins a sliding of molecules or molecular chains. Thence, polymers are said to be viscoelastic materials.

In all of the cases two types of energies operate:

1. A potential energy (Newton gravitational), which provides forces between molecules.

2. A kinetic energy (energy related to movement) which is a direct function of heat or thermal condition of the system.

In the case of solids, potential energy is > than kinetic one, which tends to separate molecules from each other. Thence, there is a systematic structure, which movement is limited by the molecular attraction.

With higher thermal energy, the system is transformed into a liquid state (very viscous molten material) in which potential and kinetic energies are equal. There is a higher relative mobility but cohesion forces are sufficiently strong in order to maintain system as a continuous medium.

Polymers two main union forces types are:

Covalent unions:

In these, there are shared electrons from the external orbital of two atoms (C—C). Their dissociation energy is of 85 Kcal/mol.

Secondary unions or van der Waals forces:

These are of an electrostatic nature. Their dissociation energy is comprised from 2 to 5 Kcal/mol.

They exist between molecules segments and molecules.

Dissociation energy varies with the $6^{th}$ power of the distance between molecules.

These generate part of the flow resistance. They are known as cohesive forces. They represent the energy required in order to separate a molecule a distance from its neighbors.

An example of energetic state may be given by the analysis of a PE cube into which material can neither be entered nor expelled. As temperature rises, distance between molecules increases. As cohesive forces decrease with the $6^{th}$ power of said distance, same are subject to a much higher mobility. This means that specific volume increases and density decreases. If the case arises, when $T_g$ is surpassed, material is transformed from solid into molten. This is the reason why all of the properties so strongly depend from temperature.

Polyethylene Types

They may be linear or branched.

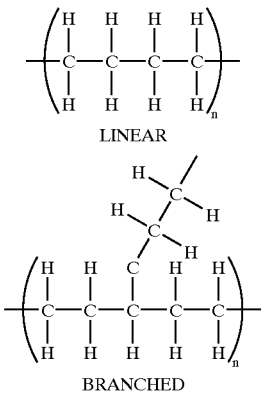

LINEAR

BRANCHED

They are obtained by means of different petrochemical processes; preferably, branched ones originate from very high pressure and temperature petrochemical processes, whereas linear ones are obtained by means of relatively low pressure and temperature.

| Properties associated to molecular configuration | |
|---|---|
| Linear | Branched |
| Higher density: molecules are closer one from the other - they occupy less volume - higher cohesive forces, van der Waals type | Lower density: molecules are more spaced due to the molecular volume → < molecular attraction → < packing |
| Lower permeability to gases and solvents: less voids, more compact molecules | Higher permeability to gases and solvents: more voids |
| Higher tensile strength: as it is a measure of the cohesive forces | Lower tensile strength: as it is a measure of cohesive forces, which are lower |
| Lower elongation at break: linear molecules are more difficult to separate. Should a stronger force be applied, molecules are broken before they slide | Higher elongation at break: linear molecules are more easily separated. Should a lower force be applied, molecular chains slide without breaking |
| Rigidity: much more rigid, there is smaller space for movements between molecules | Rigidity: there is more space for movements between molecules, branched PE are softer |
| Heat distortion point: at higher density, they require higher temperature in order to deform. This is related to the deformation heat under load. Materials of > density require additional energy in order to attain mobility of < density materials (+ branched) | Heat distortion point: they require lower temperature in order to deform. Thus, their heat distortion temperature is lower. |
| Softening point: it is also < in the case of more dense materials | Softening point: lower |
| Hardness: > density PE are harder | Hardness: < density PE are softer |
| Creep resistance: creep is the flow volume or deformation caused by a force or tension. Linear materials are more creep resistant. | Creep resistance: branched materials are less creep-resistant because they are more prone to molecular sliding when subject to tension |
| Fluid: > density materials, or linear, are not so fluid as branched ones (> Cohesive Forces) | Fluid: < density or branched materials are more fluid than linear ones (< Cohesive Forces) |

-continued

| Properties associated to molecular configuration | |
|---|---|
| Linear | Branched |
| Compressibility: at > density, as there is less space between molecules, the < is the compression capacity required | Compressibility: at < density, as molecules are more spaced from each other, the > is the compression capacity required |

Homopolymers are more linear molecules, and as such they produce more crystalline PE (with less % of amorphous phase). They exhibit a higher density, are mechanically very resistant, but fragile.

By contrast, copolymers produce more branched and lower density PE. They are more ductile PE, which are not so resistant as crystalline ones but allow a higher elongation at break and better creep properties and higher Stress Cracking resistance. Same generally render better properties in the long term.

There is a difficulty as regards polymerization processes which is related to the incorporation of monomer molecules. In the case of conventional reactors and catalysts, this generally produces a quick reduction of ethylene reactivity (AMW decreases) and the resulting structure can not be very much controlled. At present a new technology is being developed which modifies the catalysts family and changes molecular structure. This development which, for instance, is called INSIDE by Dow Química, allows the obtention of a product which structure is much more controlled, with better and more predictable properties.

As regards density, a much higher value is to be sought for in order to obtain a higher tensile strength, higher surface hardness and rigidity, higher heat distortion point and softening point, but also, there must be taken into account the average molecular weight AMW and AMW–AMWD.

Thence, polymers of higher AMW improve melt viscosity, tensile strength, elongation, creep strength (deformation under load), impact strength and environmental stress cracking (ESCR). All of the above provides a larger life to tubes.

AMW is measured by means of the melt index. These are grams per 10 minutes which can pass trough a capillary which dimensions are perfectly defined, when heated to a constant temperature of 190° C., and impelled by a 2160 g weight. With this weight, MI of polymers exhibiting AMW of up to 250,000 grams/mol can be determined. In the case of PE of AMW of up to 1,500,000, other weights are used (5000 g or 21600 g), or > temperature. Should AMW be even higher, other techniques are employed.

Another important element to be considered, apart from density and AMW, is AMW distribution.

During PE synthesis, not all of the molecules grow equally, and not all attain the same dimensions. MW variation can be very broad or rather narrow. This will depend on the polymerization process and the type of comonomers involved, if any. Then, not only one AW will exist but an AW distribution. A number or quantity of molecules will exist from each AW. There will be a more frequent AW and at each side there will be an AW reduction which generally follows a Gaussian type curve. It is probable that some process produce more than one AW peak, in which case the resulting products are known as bimodal. Obviously, depending on such curves, some of these properties will be modified. Properties dependence as regards AMW and MWD is:

| PROPERTIES | AMW increase | Wider MW distribution |
|---|---|---|
| Melt viscosity | > | Not affected |
| Tensile strength | > | Not significantly affected |
| Elongation at break | > | Not significantly affected |
| Creep resistance | > | > |
| Impact strength | > | Not significantly affected |
| ESCR strength | > | > |

As can be seen, all of these are desired properties in the manufacturing of PE tubing.

| Characteristics | Affected properties |
|---|---|
| Density | Affected by branches (comonomer type), acts on crystallinity and rigidity |
| Average Molecular Weight | It is related to > flow index, improves internal pressure strength, PE processability and mechanical properties (tensile strength, elongation at break and impact strength) |
| Molecular Weight Distribution | It affects processability and physical properties (ESCR, Creep Resistance) |

Uses of High Density Polyethylene (HDPE) Tubings and Accessories System

A system is known as a group of elements, tubings and accessories conformed as a whole by welded joints or mechanically joints (by heat-melting or electrofusion) which assure the continuity thereof as a single product, which solve the services sought for, and which joints resistance is not only secured but also higher than that of the tubings and/or accessories themselves.

Systems do not exhibit weak points, as welded joints have a better performance than that of the elements which conform same, not only as regards pressure but also as regards tension.

PE tubings may be worked in reels (up to certain diameter) or stretches.

As PE is an almost inert material as regards all of the chemical agents, and which is inalterable during its whole life, not only due to said characteristic of its being inert, but also because it is not attacked by biological agents whatsoever, which neither deposit on it, it exhibits a very good abrasion resistance and a very low coefficient of friction, its field of application is very broad as regards destination and services to which it will be subject.

It can be used at temperatures ranging from −80° C. to 40° C., and pressures ranging from 0 to 18 kg/cm$^2$.

Some of the typical uses of PE tubes are: optical fiber cables conveyance, pressure water systems, aqueducts and sanitary systems, spray irrigation, drop irrigation, oil refineries, petrochemical plants, gas and oil producing plants, mining for the conveyance of soft and hard rocks through fluidized bed, paper mills, power houses, waste water treatment plants, farming and livestock industries, breweries, food processing and fertilizers plants, industrial or urban sewers, soils recovery by drainage, gas distribution systems, etc.

Polyethylene Characterization

Certain analysis of materials behavior must be carried out in order to classify PE's.

The objective is the obtention of a product able to allow the manufacturing of a system which will accomplish functions expected during a long term ("long life") without inconveniences inherent to the system.

Accordingly, it is essential to carry out a correct system design. Design parameters are to be correctly obtained which will allow us to precisely establish that such tube with such diameter and thickness will be able to support a certain design pressure DP, throughout the period during which the system is expected to perform (up to 50 years), and that no breakage or permanent deformations are going to arise which imply repairs or changes.

Material is provided by the petrochemical company. It has a certain stipulated mechanical behavior which allows the further design thereof.

In order to stipulate said behavior a procedure is followed, as per Standard ISO 9080/92 ("Thermoplastic Tubes for Fluids Conveyance—Standard Extrapolation Method for the Obtention of Long Term Resistance at a Constant Internal Pressure" (see FIG. 21).

Different standard samples of tubes with perfectly defined geometrical characteristics are subject to different constant pressures at a given temperature, according to specifications. Due to the use of high pressures, some samples are forced to fail. Then statistical predictions are made on the service life and long term resistance of tubes, on the basis of the number of forced failures and the time elapsed until they failed. Information is plotted in a certain manner which is known as "Strength and Life Curve". This curve provides a determined relation between the expected life of tubes and the internal stresses at a given operation temperature.

The regression curve is drawn, which will be a straight line in a Log-Log graphic, this is extrapolated to 50 years (438000 hours) and two straight lines are drawn; one on top and the other under it. The bottom one is the lower confidence limit (LCL) which amounts to 97.5% of the regression curve value.

According to the values resulting from this straight line, in its intersection with the time (50 years) three different ranges are taken for HDPE:

All those PE in which the intersection of the LCL line with the 50 years time corresponds to a tension >10 MPa are classified as PE 10 (MPa), PE 100 (Ba) or MRS (minimum required strength) of 10 MPa or MRS 100 (Ba).

All those PE in which the intersection of the LCL line with the 50 years time corresponds to a tension $\leq$10 MPa and >8 MPa are classified as PE 8 (MPa), PE 80 (Ba), or MRS of 8 MPa or MRS 80 (Ba).

All those PE in which the intersection of the LCL line with the 50 years time corresponds to a tension $\leq$8 MPa and >6.3 MPa are classified as PE 6.3 (MPa), PE 63 (Ba), or MRS of 6.3 MPa or MRS 63 (Ba).

When working with tubes design, the minimum MRS required strength affected by a coefficient of safety "C" is used. This value will depend on the use the system is to be subject to. Some typical values are:

C$\geq$2—gas tubes

C$\geq$1.25—water systems tubes

With "C" value the design tension $\delta_s$ is computed, which is the maximum allowable tension for a certain application: $\delta_s$=MRS/C.

Now we will refer to the inventive multitubular device production process, particularly to the production of an heptatube.

Production Procedure: "Tubing-profile" Concept

The procedure for the obtention of the heptatubular device according to the present invention comprises the following stages:

1. Extrusion, with or without co-extrusion
2. Pre-calibration
3. Calibration (airtight pan operating in vacuo, with grooved bronze starting calibrator and distribution plates with smaller to larger separation as it separates from the calibrator or inlet area; with spray cooling)
4. Cooling (one or more pans with spray cooling)
5. Hauling (extractor or caterpillar type hauling with two or more tracks, with speed regulation)
6. Marking (with printing equipment, Hot Stamping type, or ink jet printing equipment, including all of the information necessary in order to identify tubing, supplier, material, main tube and cavities dimensions, customer's name when so required, registered trademark, and any other requested data)
7. Winding Stages description will be limited to those which distinguish this particular product or those which require an additional comment. The other stages, being similar to those related to the obtention of a conventional tubing, will be limited to the information given in the stages listing wording (calibration, cooling, haulage and marking).

1. Extrusion, with or without Co-extrusion

The extrusion procedure requires:

(a) a conventional extruder for HDPE, single screw, screw length to diameter ratio (L/D)$\geq$30:1, processing capacity 150 and 250 kg/hr;

(b) helicoidal or crate type tubes head (c) power die for the development of the "Tubing-Profile" principle development.

(d) internal cooling system (e) co-extruder only in the case in which identification longitudinal lines are to be included (blue or other color)

Also in this case non-conventional stages are described, (c) and (d), the precedent description being enough for the other stages.

(c) According to the enclosed drawings, this head operates with the profile type production criteria, in which material from head (b) is confined within a cavity which only outlet is through the external nozzle consisting of an assembly of six trapezoidal leaves or sole cylindrical piece with internal cylindrical hole and radial grooves for the generation of trapezoidal cavities (directed flow), and one of central cylindrical shape. In this way, profile seen in FIGS. 2 to 10 is conformed. It is to be noted that all of the leaves or said sole piece are drilled, which allows them to bear an independent external air connection for each cavity. Calibration system comprised by stages 2 and 3 [pre-calibrator (FIG. 24) and calibration pan] operates in vacuo. As each of the cavities is conformed at atmospheric pressure (due to the above mentioned external connections and perforations of all of the leaves or the sole piece), and the internal calibrating chambers pressure is lower that the atmospheric one, all of the system tends to inflate like a balloon, and copies the internal wall of the respective calibrators, adjusting the internal diameter (see FIG. 22).

Lastly, it is to be noted that should the customer request an identification by means of external longitudinal lines, which quantity should be determined (2, 3, 4 or more), another much smaller extruder will be used, which will provide material in the desired color. This extruder is called co-extruder, and it is applied to the die outlet piece with a conventional coupling and channeling device (see FIG. 23).

2. Pre-calibration

This is carried out with a pre-calibrator as per FIG. 24 schematics.

This pre-calibrator includes the following parts:

(a) Liquid ring system which performs two functions: lubrication of tube emerging from the extruder and entering the pre-calibrator itself, and production of a first smooth cooling of the external surface of the tube, in order to improve its surface appearance.

(b) Pre-calibrator itself, which consists of two parts:

1. A main body which bears two machined main helicoids (clearer and darker in the schematics) of equal pitch but spaced half a pitch one from the other. One of said helicoids has vacuum purposes. It bears a single vacuum inlet and it is connected to the interior of the pre-calibrator by means of small orifices along the helicoid. The other main helicoid is for cooling water conveyance. It is not connected to the interior of the calibrator and acts by conduction (not by contact). It bears a water inlet and outlet, which water is then sprayed by means of a disperser in order to soak tube before it enters the next equipment, namely the calibration pan. On the outer surface of this main body, and intercalated between main helicoids, there are to be machined two small secondary helicoids, in which an o-ring type rubber is to be inserted, which rubber will act as a seal and spacer between the vacuum and water cavities.

2. A cylindrical cover which shall tightly seal main body of pre-calibrator and operate above mentioned o-rings.

7. Winding

Winding shall be done with an important internal diameter due to two facts.

First, while this tubing has a higher winding possibility than in the case of conventional tubings, because internal walls (partitions which separate cavities) act as reinforcements, they still need a significant reel diameter in order to avoid an excessive wall narrowing.

The second effect is inherent to the material. The curvature ratio admitted by this material is directly related to the external diameter of the tube and the thickness thereof.

On the other hand, as the weight per meter of the tube exceeds two kilograms, a 300 meter reel weights more than 600 kilograms, which along with its volume calls for extra precautions during its further handling. Trailer and reel use is recommended when unwinding, in order to provide a safe operation.

Accordingly, it is another object of the present invention a procedure for the production of the multitubular device, which comprises the following consecutive stages:

extrusion of high density polyethylene (HDPE), carried out by means of an extruder which comprises a power die for the elaboration of a multitubular profile device, said die being comprised of an assembly of leaves or sole piece, each of the leaves or the area comprised between the grooves of the sole piece bearing a perforation for the connection thereof to external air in order that each of the cavities of the conformed multitubular profile device may be at the atmospheric pressure;

pre-calibration of the multitubular profile device originated from the extrusion stage, in which in first instance a liquid ring system lubricates the multitubular profile device emerging from the extruder and produces a first smooth cooling of the external surface of said multitubular profile device in order to improve its surface appearance, wherein, in a second instance the multitubular profile device originated from said first instance passes through the pre-calibrator main body, in which the multitubular profile device spontaneously inflates due to the pressure difference existing between the multitubular profile device cavities which are at atmospheric pressure and the main body pressure which operates under a vacuum, the multitubular profile device thence copying the internal wall of the pre-calibrator main body and adjusting itself in this way to the external diameter of the multitubular profile device, said main body also exhibiting a water outlet which is sprayed with a disperser in order to soak the multitubular profile device before it enters the following stage;

vacuum calibration in an airtight pan and spray cooling of the multitubular profile device proceeding from the pre-calibration stage;

spray cooling the multitubular profile device emerging from the calibration stage in a pan;

hauling of the multitubular profile device emerging from the cooling stage by means of an extractor or by means of a two-track hauling appliance;

optional marking of the multitubular profile device originated from the hauling stage, and winding of the multitubular profile device originated from the hauling stage or eventually, from the marking stage.

As previously expressed, the extrusion stage may also be carried out with a co-extruder.

In the particular case of the heptatube, said die consists of an assembly of six trapezoidal leaves or cylindrical single piece with internal cylindrical hole and radial grooves which generate trapezoidal cavities (directed flow), and of one of central cylindrical shape, each of the leaves or area comprised between the sole piece grooves exhibiting a perforation for the connection thereof to external air.

Installation Processes

As previously mentioned, the multitubular device, particularly the heptatube, dodecatube and tridecatube, can be contemplated for conventional installations, and other installations designed by new technologies, such as trenchless techniques.

As regards the latter, the fact of introducing a product that is more compact (smaller tunnel size), absolutely adequate for the installation thereof (lower frictional resistance), with higher resistant tensile stress (it allows laying of more meters without reaching the already explained yield strength), make this multitubular device, particularly the heptatube, the dodecatube and the tridecatube, apt for the installation thereof by means of smaller tunneling machines, with shorter times involved and with longer distances between connection chambers.

There follow some examples which refer to the installations to such effects.

1. Maximum distance for the throwing of optical fiber cable.

Some considerations are to be made for this computation which derive from the configuration of the optical fiber cable located inside the HDPE jacket tube. During said study, frictional and weight stresses were considered for the computation of the hauling force to be used in order to haul the optical fiber cable through the jacket tube.

It is to be noted that the friction coefficient used for the computation is valid for the installation of underground HDPE tubing (by means of tunneling), and thence, in our case, the coefficient corresponding to OF cable—HDPE jacket tube system should be smaller than or equal to the assumed coefficient. Accordingly, the hauling force computed from it will be in any case higher than that actually required. It is an excess value ⇒ additional safety coefficient.

Computation methodology:
Hypothesis:
Hypotheses used up to now are:
1. Contact surface is no more than a portion of the internal area of each cavity of the heptatube.
2. Resistance to be surmounted consists of those which generate the friction of the optical fiber cable against the jacket tube internal walls, and the optical fiber cable weight (the latter being affected by a value ranging from $0.3 \leq \mu \leq 0.5$).
3. A friction resistance is adopted in the HDPE tubing= 0.15 kg/M$^2$.
4. In order to consider the optical fiber cable two different examples were taken:
   48-fiber cable; cable diameter 10.5 mm; 0.102 kg/mt; maximum hauling force 4200 Newton; allowed hauling force 1400 Newton.
   144-fiber cable; cable diameter 18.5 mm; 0.315 kg/mt; maximum hauling force 5500 Newton; allowed hauling force 2000 Newton. See FIG. 6.

Computation:

Calculation will determine whether the hauling force required to install the optical fiber into the HDPE tube is lower than the allowable maximum hauling force in the case of an optical fiber OF.

An internal grooving favors sliding of OF cable, specially when long distances are involved. It is to be considered that heptatubes special geometry implies that, from all of the internal area within each cavity, only a small portion is to contact the Optical Fiber cable, and that the smaller the OF cable OD, the smaller will be said area. We assume the contact will take place on an area equivalent to a 10$^{th}$ of the external OF cable area.

Stages:

1. Computation of the Area Contacted by OF Cable and HDPE Tube Per Meter $A_1 = \Pi * \emptyset$ OF EXT CABLE*100 cm/m/10=$\Pi * 1.8$ cm*100 cm/m/10. $A_1 = 57$ cm$^2$/m.

2. Computation of hauling friction strength per meter with friction coefficient:

$R_{FRIC}$/meter=$\delta$FRIC*$A_1$=15 kg/m$^2$*57 cm$^2$/m*$10^{-4}$ m$^2$/cm$^2$ $R_{FRIC}$/meter=0.0855 kg/m 3. Computation of friction resistance per weight with weight per meter of OF cable:

For heavier fiber=0.315 kg/m
Correction factor $\mu$=0.3 for HDPE PE⇒
⇒ $R_{WEIGHT}$/meter=0,0945 kg/m 4. Total hauling resistance/meter=$R_{FRIC}$/meter+$R_{WEIGTH}$/meter=Total hauling resistance/meter=0,0855 kg/m+0,0945 kg/m=
Total hauling resistance/meter=0.18 kg/m 5. Maximum OF fiber meters that can be laid with the allowable hauling force of 2000 Newton=200 kg$_f$ Maximum length to be laid=200 kg$_f$/0.18 kg$_f$/m
Maximum length to be laid=1111 m

Conclusion

More than 1000 meters of OF cable may be laid without generating tensions higher than those allowed.

In the case of an OF cable of 144 OF and 500 meters the hauling force should be of 0.90 kg$_f$. In the case of a cable with 48 OF, conditions would be even better.

In order to compute the internal pressure which each cavity would withstand without deterioration, it should be considered cylindrical, with an internal diameter equivalent to 32.5 mm ([from the calculation of the internal perimeter of each cavity divided by n and a (minimum) thickness of 2.5 mm. In this case it would withstand an internal pressure of 9.5 Ba (with a MRS 80 Ba type HDPE). This would be the design pressure, whereby the cavity could be subject to a pressure up to 1.5 the design pressure during brief periods without the risk of permanent damage to the tube.

A strategy to be considered is to convey all of the emissaries simultaneously through the seven tubes, thus producing two simultaneous effects:
   installation times are quicker,
   pressures between different cavities are compensated, avoiding deterioration of internal membranes.

Thence, the maximum laying distance of OF cable will depend on the maximum hauling force the fiber may withstand, and on the maximum distance the emissary may be thrown at. Knowing the emissary's weight, contact area on the internal surface of each cavity, and its area strength as regards compressed air thrust, and maximum operating pressure supported by said cavity, it would be possible to calculate the length which the emissary will reach.

Application Fields of the Inventive Multitubular Device

The following are some of the applications contemplated for a multitubular device, particularly in the case of a heptatube, dodecatube and tridecatube:

Laying of any kind of cables, for instance:
1. Communications—Optical Fiber
   (a) Fixed plant telephony
   (b) Cellular telephony
   (c) Data transmission
   (d) Signaling (railways, metro, highways, etc.)
2. Cable TV
3. Electric power
4. Coaxial
5. Computers Obviously this is a minimum part of a much complete applications list which will apparent as the product is known in the market.

What is claimed is:

1. A multitubular conduit for underground cables including optical fiber, coaxial TV, electric power, telephonic, and computer cables, comprising:
   a peripherally closed external cylindrical tubing having a circular cross-section, a smooth exterior surface of a diameter in the range of from 108.5 mm to 163 mm, and a longitudinally constant profile or invariable section; and
   longitudinally extending, individual, internal cavities within said external cylindrical tubing, each of said internal cavities having a cross-sectional area larger than that of at least one of the underground cables and defined at least in part by radial separating membranes extending inwardly of said external cylindrical tubing, and in part by at least one peripherally closed internal circular or regular polygonal wall defining a central cavity generally concentric with said external cylindrical tubing, said external cylindrical tubing, said separating membranes, and said at least one peripherally closed internal circular or regular polygonal wall being made of a plastic material having the physical properties of high density polyethylene (HDPE).

2. A multitubular device according to claim 1, comprising thirteen internal cavities defined by separating membranes; twelve of said internal cavities being trapezoidal and arranged in annular fashion about the central cavity; a first concentric ring with the central cavity including six of the twelve trapezoidal cavities defined by separation membranes between them; and a second or outer ring of cavities comprising the remaining six of the twelve trapezoidal cavities, defined by separating membranes placed between them, the external cylindrical tubing and the first ring of cavities; the membranes separating the trapezoidal cavities of the first ring between them and the membranes separating the cavities of the second or outer ring being aligned or alternate and the second or outer ring of cavities being capable of receiving cementitious mortars for mechanical protection of the first ring of cavities and central cavity.

3. A multitubular device according to claim 2, wherein the external cylindrical tubing has an external diameter in the range of 157–163 mm and an internal diameter between 144 and 154 mm, the thickness of each of the membranes separating trapezoidal cavities is between 1.5 and 5.5 mm, and the thickness of the at least one peripherally closed internal circular or regular polygonal wall is between 1.5 and 5.5 mm.

4. A multitubular device according to claim 2, wherein said internal circular or regular polygonal wall is inscribed within a circumference of a diameter ranging from 26 mm to 40 mm, and said internal circular or regular polygonal wall circumscribes a circumference of a diameter ranging from 22 mm to 36 mm, thickness of each of the membranes separating trapezoidal cavities from each other ranges from 1.5 mm to 5.5 mm, thickness of the at least one peripherally closed internal circular or regular polygonal wall separating trapezoidal cavities from the central cavity also ranges from 1.5 to 5.5 mm, and thickness of the membrane separating the first and second or outer rings also ranges from 1.5 and 5.5 mm.

5. A multitubular device according to claim 2, wherein the external diameter of the internal circular or regular polygonal wall ranges between 26 mm and 40 mm and a variable internal diameter is between 22 mm and 36 mm, thickness of each of the membranes separating trapezoidal cavities ranges between 1.5 mm and 5.5 mm, thickness of each of the membranes separating the trapezoidal cavities and the internal wall defining the central cavity also ranges between 1.5 mm and 5.5 mm, and the membrane separating the first ring from the second or outer ring ranges between 1.5 and 5.5 mm.

6. A multitubular device according to claim 1, comprising thirteen cavities defined by separating membranes, twelve of said cavities being of trapezoidal shape and arranged about the internal circular or regular polygonal wall and concentric with said external cylindrical tubing, the internal wall defining internal smaller sides of each of said trapezoidal cavities and the internal outline of the central cavity.

7. A multitubular device according to claim 6, wherein the external cylindrical tubing has an external diameter in the range of 157–163 mm and an internal diameter in the range of between 144 and 154 mm, the thickness of the membranes separating trapezoidal cavities from each other ranges between 1.5 and 5.5 mm, the thickness of the internal wall separating trapezoidal cavities from the central cavity ranges between 1.5 and 5.5 mm, and the thickness of the external cylindrical tubing ranges from 3 to 8 mm.

8. A multitubular device according to claim 6, wherein said circular or regular polygonal wall is inscribed within a circumference of a diameter ranging from 89 mm to 95 mm, and circumscribes a circumference of a diameter ranging from 84 mm to 90 mm, thickness of each of the membranes separating trapezoidal cavities from each other ranges from 1.5 mm to 5.5 mm, and thickness of the internal wall separating trapezoidal cavities from the central cavity also ranges from 1.5 to 5.5 mm.

9. A multitubular device according to claim 6, wherein the outside diameter of the internal central cavity ranges from 89 to 95 mm, and its internal diameter ranges from 84 to 90 mm, and wherein thickness of each of the membranes separating trapezoidal cavities varies from 1.5 to 5.5 mm and thickness of the internal wall separating trapezoidal cavities from the internal central cavity also ranges from 1.5 to 5.5 mm.

10. A multitubular device according to any one of claims 6 to 9, including HDPE monotubes of smaller external diameter than the central cavity and received in the central cavity, whereby the multitube capacity is extended, said central cavity being spared for future expansions.

11. A multitubular device according to claim 1, comprising twelve cavities defined by separating membranes, eight of the twelve cavities having irregular trapezoidal shape, said central cavity being divided into four equivalent section cavities to provide the remainder of the twelve cavities, the intersection of membranes separating said four cavities in which the central cavity is divided forming a central core, the internal wall defining the central cavity also defining the smaller interior sides of each of said trapezoidal cavities.

12. A multitubular device according to claim 11, wherein said external cylindrical tubing has an external diameter in the range of 157 to 163 mm and an internal diameter ranging from 144 to 154 mm, thickness of each of the membranes separating trapezoidal cavities from each other ranges from 1.5 to 5.5 mm, and thickness of the internal wall separating each of the trapezoidal cavities from the central cavity ranges from 1.5 to 5.5 mm.

13. A multitubular device according to claim 11, wherein the internal central cavity is inscribed within a circumference of a diameter ranging from 66 mm to 84 mm, and the central cavity circumscribes a circumference of a diameter ranging from 63 mm to 81 mm; thickness of each of the membranes separating the trapezoidal cavities from each other ranges from 1.5 mm to 5.5 mm; thickness of the internal wall separating each of the trapezoidal cavities from the central cavity ranges from 1.5 mm to 5.5 mm; and thickness of membranes separating the divisions of the central cavity ranges from 1.5 to 5.5 mm.

14. A multitubular device according to claim 11, wherein the internal central cavity outer diameter ranges from 66 mm to 84 mm and the inner diameter thereof ranges from 63 mm to 81 mm; thickness of each of the membranes separating trapezoidal cavities from each other ranges from 1.5 mm to 5.5 mm; thickness of the internal wall separating trapezoidal cavities from central cavity also ranges from 1.5 to 5.5 mm, and thickness of the membranes separating the divisions of the central cavity also ranges from 1.5 to 5.5 mm.

15. A multitubular device according to claim 1, comprising seven cavities defined by separating membranes, six of said seven cavities being of equivalent area and of trapezoidal shape, and the at least one peripherally closed internal wall is circular to define an internal circular cavity as the remaining one of the seven cavities and to define smaller circular sides of each of said trapezoidal cavities.

16. A multitubular device according to claim 15, wherein said external cylindrical tubing has an outer diameter of 110 mm and the internal circular cavity has an outer diameter of 97.6 mm, the thickness of each of the membranes separating trapezoidal cavities is 3 mm and the thickness of the internal wall separating the trapezoidal cavities from the circular cavity is 3.05 mm.

17. A multitubular conduit for underground cables including optical fiber, coaxial TV, electric power, telephonic, and computer cables, comprising a peripherally closed external cylindrical tubing having a circular cross-section, an external diameter in the range of from 108.5 mm to 111.5 mm and a longitudinally constant profile or invariable section with seven longitudinally extending, individual, internal cavities defined by separating membranes, each of said internal cavities having a cross-sectional area larger than that of at least one of the underground cables, six of said cavities being of irregular trapezoidal form and a remaining central cavity being of circular, hexagonal or regular polygonal form, said central cavity being concentrically arranged with respect to said outer cylindrical tubing, a separating membrane between said trapezoidal cavities and said central cavity defining internal smaller sides of each of said trapezoidal cavities and an internal perimeter of the central cavity, the membrane separating said trapezoidal cavities and said central cavity, said external cylindrical tubing, and said separating membranes separating said trapezoidal cavities from each other being made of plastic material having the physical properties of high density polyethylene (HDPE).

18. The multitubular conduit of claim 17, wherein the internal diameter of the peripherally closed cylindrical tubing is in the range of from 94 mm to 104 mm, the thickness of each of the trapezoidal cavities separating membranes is in the range of from 1.5 to 5.5 mm, the thickness of each of the separating membranes between said trapezoidal cavities and said central cavity is in the range of from 1.5 to 5.5 mm, and the external membrane is in the range of from 3 to 8 mm.

19. The multitubular conduit of claim 17, wherein said hexagonal or regular polygonal central cavity is inscribed within a circumference of a diameter ranging from 36 mm to 48 mm, and, in turn, said hexagonal or regular polygonal central cavity circumscribes a circumference of a diameter ranging from 30 mm to 42 mm, the thickness of each of the membranes separating trapezoidal cavities from each other ranging from 1.5 mm to 5.5 mm, and the thickness of each of the membranes separating trapezoidal cavities from the central cavity ranges from 1.5 to 5.5 mm.

20. The multitubular conduit of claim 17, wherein the internal central cavity is of circular cross section having an external diameter ranging from 36 mm to 48 mm and an internal diameter ranging from 30 mm to 42 mm, the thickness of each of the membranes separating trapezoidal cavities from each other ranging from 1.5 mm to 5.5 mm, and the thickness of each of the membranes separating trapezoidal cavities from the remaining cavity also ranges from 1.5 to 5.5 mm.

21. The multitubular conduit of any one of claims 1–9 and 11–20 to be wound on a drum.

22. A multitubular device according to any one of claims 1–9 and 11–20, wherein the internal surface of said cavities is grooved or slotted.

* * * * *

UNITED STATES PATENT AND TRADEMARK OFFICE
CERTIFICATE OF CORRECTION

PATENT NO.    : 6,564,831 B1
DATED         : May 20, 2003
INVENTOR(S)   : Sergio Oscar Sanoner et al.

It is certified that error appears in the above-identified patent and that said Letters Patent is hereby corrected as shown below:

<u>Title page, Item [54] and Column 1, line 1,</u>
Title, "ENTRUDED" should read -- EXTRUDED --.

Signed and Sealed this

Ninth Day of March, 2004

JON W. DUDAS
*Acting Director of the United States Patent and Trademark Office*